United States Patent
Minemura et al.

(10) Patent No.: US 10,252,716 B2
(45) Date of Patent: Apr. 9, 2019

(54) DRIVING ASSIST APPARATUS AND DRIVING ASSIST METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Akitoshi Minemura, Kariya (JP); Wataru Ike, Toyota (JP); Kazuki Nemoto, Toyota (JP)

(73) Assignees: DENSO CORPORATION, Kariya, Aichi (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/562,299

(22) PCT Filed: Mar. 7, 2016

(86) PCT No.: PCT/JP2016/057013
§ 371 (c)(1),
(2) Date: Sep. 27, 2017

(87) PCT Pub. No.: WO2016/158223
PCT Pub. Date: Oct. 6, 2016

(65) Prior Publication Data
US 2018/0118203 A1    May 3, 2018

(30) Foreign Application Priority Data
Mar. 31, 2015    (JP) ................................ 2015-072921

(51) Int. Cl.
*A01B 69/00*        (2006.01)
*B60W 30/09*        (2012.01)
(Continued)

(52) U.S. Cl.
CPC ............. *B60W 30/09* (2013.01); *B60R 21/00* (2013.01); *B60W 10/04* (2013.01); *B60W 10/18* (2013.01); *B60W 10/20* (2013.01); *B62D 15/0265* (2013.01); *G08G 1/16* (2013.01); *G08G 1/166* (2013.01); *B60R 21/0134* (2013.01); *B60W 2540/10* (2013.01); *B60W 2540/12* (2013.01); *B60W 2540/18* (2013.01); *B60W 2550/10* (2013.01); *B60W 2710/18* (2013.01); *B60W 2710/20* (2013.01)

(58) Field of Classification Search
None
See application file for complete search history.

(56) References Cited

U.S. PATENT DOCUMENTS

2005/0240328 A1*   10/2005   Shirato .................. B62D 1/286
                                                                    701/41
2007/0109110 A1     5/2007   Ohmura et al.
(Continued)

FOREIGN PATENT DOCUMENTS

JP         2000-149161         5/2000
JP         2000-149161 A       5/2000
(Continued)

*Primary Examiner* — Adam M Alharbi
(74) *Attorney, Agent, or Firm* — Knobbe, Martens, Olson & Bear, LLP

(57) ABSTRACT

A driving assist apparatus activates a safety device for avoiding a collision of an own vehicle with a target or reducing damage from the collision. The driving assist apparatus determines start of a collision avoidance operation for the target. The driving assist apparatus performs a delaying process for delaying an activation timing of the safety device, when the start of the collision avoidance operation is determined, the delaying process setting the activation timing to a timing later than a timing that would be set when the start of the collision avoidance operation is not determined. The driving assist apparatus determines, based on the activation timing, whether to activate the safety device. The driving assist apparatus continuously performs the delaying process until a predetermined time period elapses after the start of the collision avoidance operation.

15 Claims, 11 Drawing Sheets

(51) Int. Cl.
*B60R 21/00* (2006.01)
*G08G 1/16* (2006.01)
*B60W 10/04* (2006.01)
*B60W 10/18* (2012.01)
*B60W 10/20* (2006.01)
*B62D 15/02* (2006.01)
*B60R 21/0134* (2006.01)

(56) References Cited

U.S. PATENT DOCUMENTS

| | | | |
|---|---|---|---|
| 2008/0097699 A1 | 4/2008 | Ono | |
| 2012/0235501 A1* | 9/2012 | Kesler | H03H 7/40 |
| | | | 307/104 |
| 2013/0211687 A1* | 8/2013 | Trost | B60T 7/22 |
| | | | 701/70 |
| 2018/0118205 A1* | 5/2018 | Minemura | B60T 7/12 |
| 2018/0122242 A1* | 5/2018 | Minemura | B60Q 9/008 |

FOREIGN PATENT DOCUMENTS

| | | |
|---|---|---|
| JP | 2004-206207 | 7/2004 |
| JP | 2007-137126 A | 6/2007 |
| JP | 2011-195083 | 10/2011 |
| JP | 2012-011862 | 1/2012 |
| JP | 2012-103969 A | 5/2012 |
| JP | 2012-196997 | 10/2012 |
| JP | 2016-175572 | 10/2016 |
| WO | 2006/070865 A1 | 7/2006 |

* cited by examiner

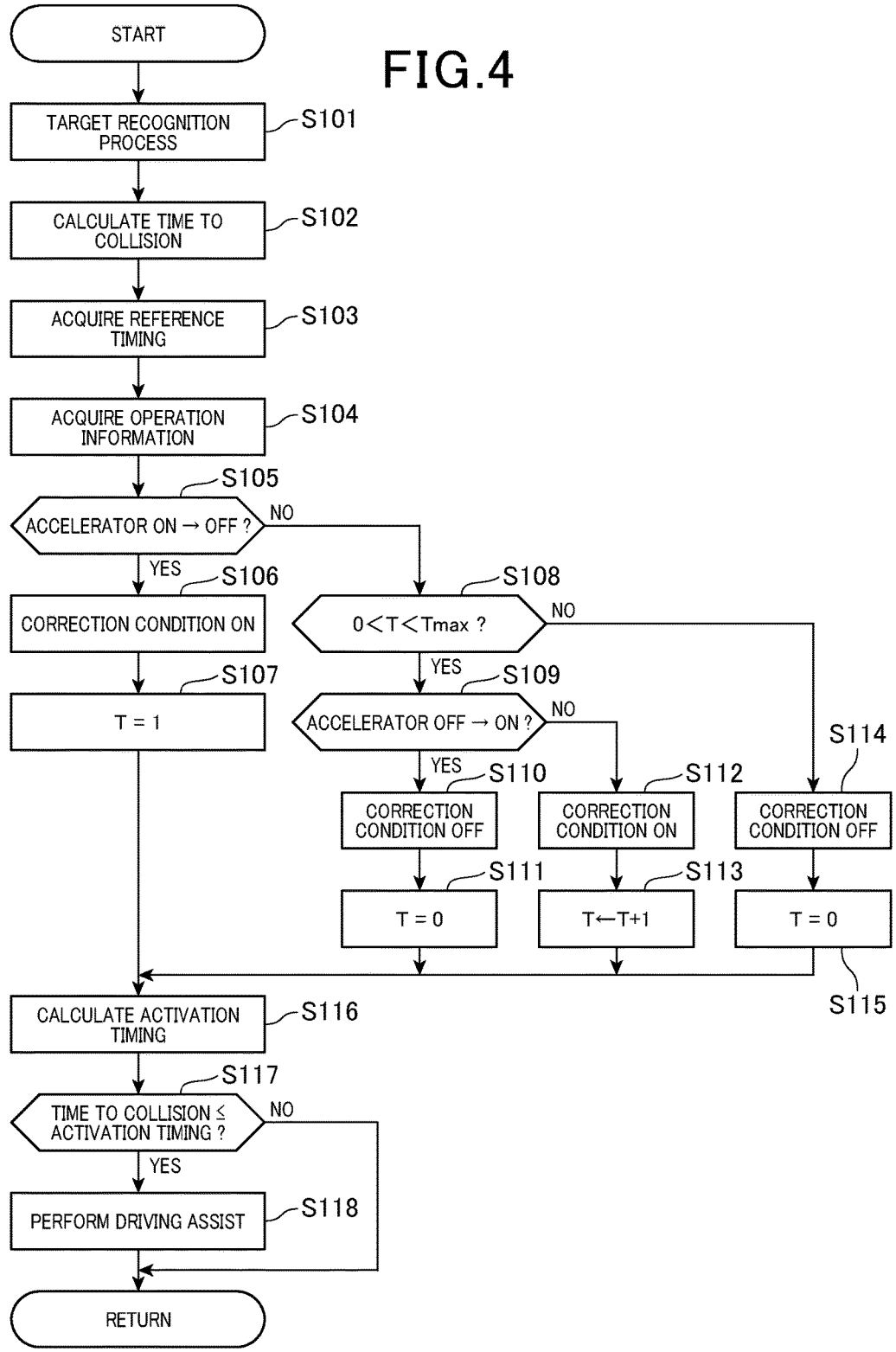

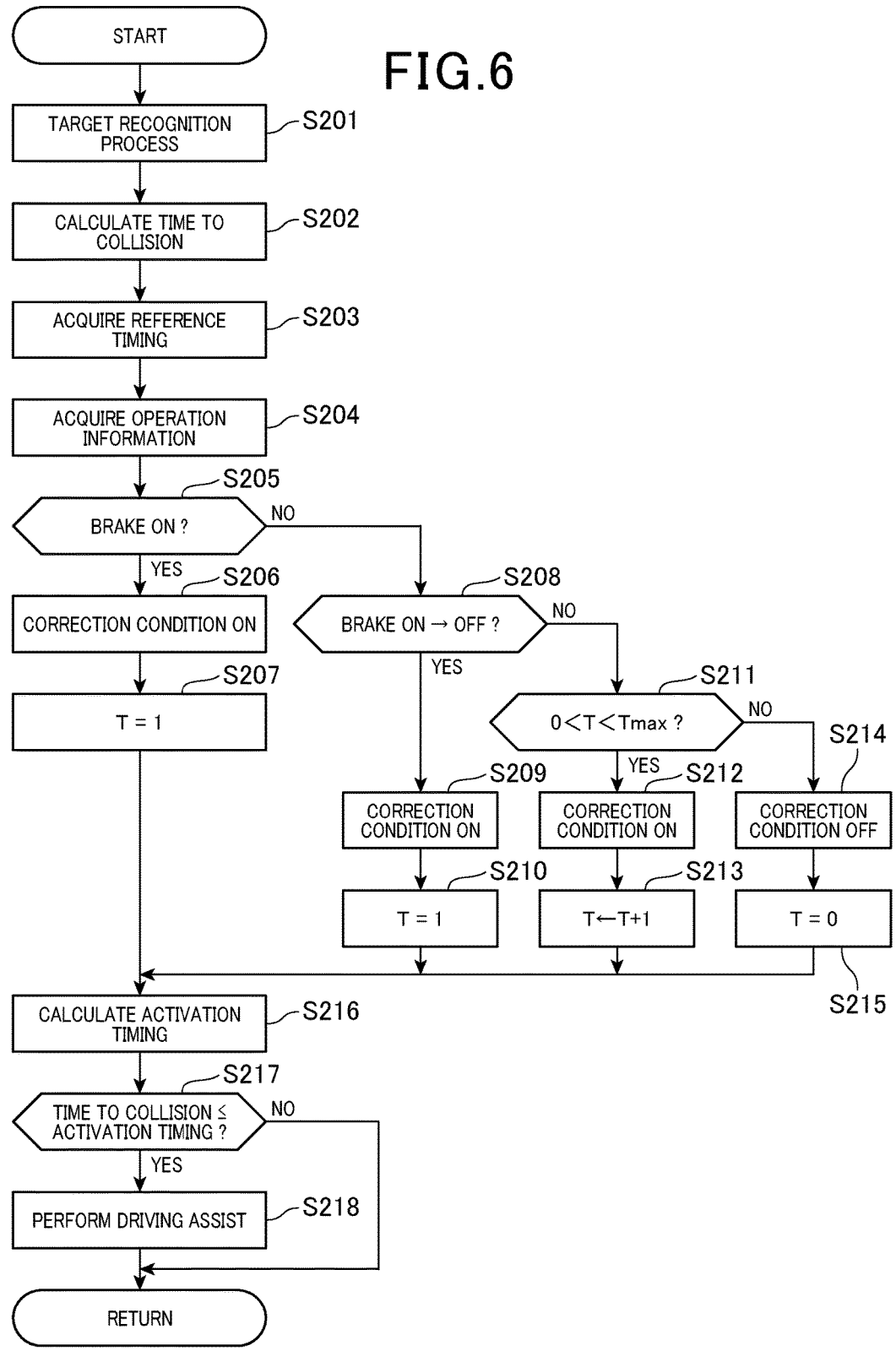

FIG. 13A
FIG. 13B
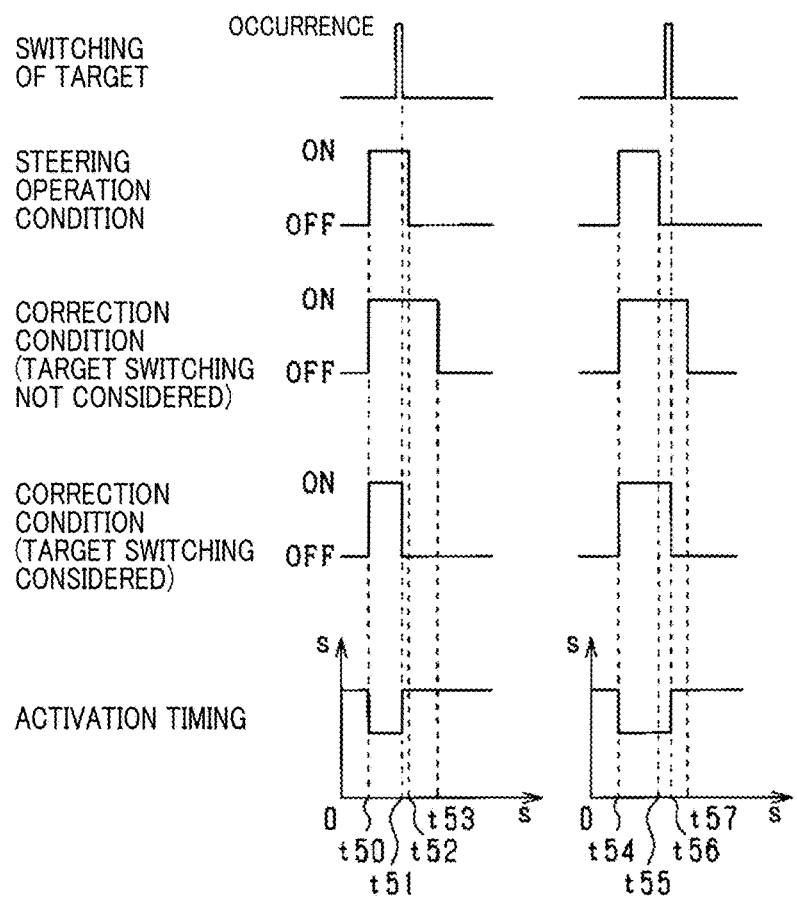
FIG. 14
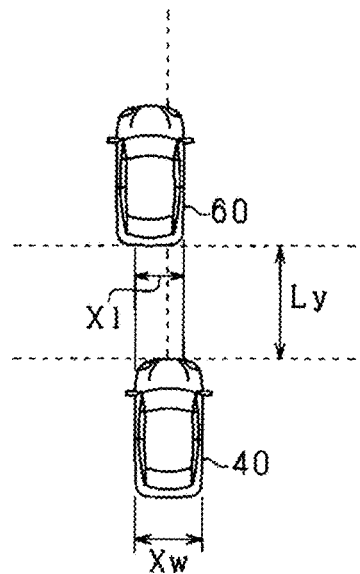

DRIVING ASSIST APPARATUS AND DRIVING ASSIST METHOD

CROSS-REFERENCE TO RELATED APPLICATION

This application is based on and claims the benefit of priority from earlier Japanese Patent Application No. 2015-072921 filed on Mar. 31, 2015, the description of which is incorporated herein by reference.

TECHNICAL FIELD

The present disclosure relates to a driving assist technique for activating a safety device in the own vehicle when there is a possibility that the own vehicle will collide with a target ahead of the own vehicle in its direction of travel.

BACKGROUND ART

A pre-crash safety (PCS) system has been developed that reduces or prevents damage from a collision between the own vehicle and a target (another vehicle, a pedestrian, a road structure, etc.) that is located ahead of the own vehicle in its direction of travel. The PCS system calculates time to collision (TTC), which is an estimate of the time remaining until the own vehicle collides with a target, based on the relative distance and relative velocity or relative acceleration between the own vehicle and the target. Based on the calculated TTC, the PCS system, for example, uses a notification device or the like to notify the own vehicle's driver that the own vehicle is approaching the target, or activates a braking device in the own vehicle.

A driving assist apparatus disclosed in PTL 1 relates to the PCS system. According to the driving assist apparatus of PTL 1, a risk level is set that indicates the probability of a collision between the own vehicle and a target, and information based on the risk level is presented to the driver.

CITATION LIST

Patent Literature

[PTL 1] JP 2012-103969 A

SUMMARY OF THE INVENTION

Technical Problem

The PCS system may annoy the driver trying to avoid a collision when it causes a safety device to be unintentionally activated.

An object of the present disclosure is to provide a driving assist technique that appropriately sets an activation timing of a safety device according to a driver's decision.

Solution to Problem

A first driving assist apparatus of the present disclosure is a driving assist apparatus that activates a safety device for avoiding a collision between the own vehicle and a target around the own vehicle or reducing damage from the collision, when there is a possibility that the own vehicle will collide with the target, the driving assist apparatus includes an operation determination means, a delaying means, and an activation determination means. The operation determination means determines whether a collision avoidance operation has been started by the driver, when the target is present around the own vehicle. The delaying means performs a delaying process for delaying an activation timing at which the safety device is activated, if it is determined that the collision avoidance operation has been started, the delaying process setting the activation timing to a timing later than a timing that would be set if it were not determined that the collision avoidance operation has been started. The activation determination means determines whether to activate the safety device, based on the activation timing. The delaying means continues the delaying process until a predetermined time period elapses after the collision avoidance operation has been started.

According to the configuration, it is determined whether the driver has decided to avoid a collision, based on whether a collision avoidance operation has been started. Then, an activation timing of the safety device is delayed according to the driver's decision. This allows the driving assist apparatus of the present disclosure to prevent unnecessary activation of the safety device (condition in which a safety device is activated when it does not need to be activated; hereinafter referred to as "unnecessary activation"). According to the configuration, the delaying process for delaying an activation timing of the safety device ends after the predetermined time period elapses since the collision avoidance operation has been started by the driver. This allows the driving assist apparatus of the present disclosure to prevent non-activation of the safety device (condition in which a safety device is not activated when it needs to be activated).

A second driving assist apparatus of the present disclosure is a driving assist apparatus that activates a safety device for avoiding a collision between the own vehicle and a target around the own vehicle or reducing damage from the collision, when there is a possibility that the own vehicle will collide with the target, the driving assist apparatus includes an operation determination means, a delaying means, and an activation determination means. The operation determination means determines whether a collision avoidance operation has been performed by the driver, when the target is present around the own vehicle. The delaying means performs a delaying process for delaying an activation timing at which the safety device is activated, if it is determined that the collision avoidance operation has been performed, the delaying process setting the activation timing to a timing later than a timing that would be set when it were not determined that the collision avoidance operation has been performed. The activation determination means determines whether to activate the safety device, based on the activation timing. The delaying means continues the delaying process until a predetermined time period elapses after the collision avoidance operation has finished.

For example, if a collision avoidance operation is continuously performed by the driver, the collision avoidance operation may be temporarily suspended. In that case, unnecessary activation of the safety device may occur if the delaying process for delaying an activation timing of the safety device ends. According to the configuration, if a collision avoidance operation is continuously performed by the driver, the delaying process continues until a predetermined time period elapses after the collision avoidance operation has finished. This allows the driving assist apparatus of the present disclosure to prevent unnecessary activation of the safety device when the collision avoidance operation performed by the driver is temporarily suspended. According to the configuration, the delaying process for delaying an activation timing of the safety device ends after the predetermined time period elapses since the collision avoidance operation performed by the driver has finished. This allows the driving assist apparatus of the present disclosure to prevent a delay in activation of the safety device when there is a possibility that a collision will occur.

BRIEF DESCRIPTION OF THE DRAWINGS

FIG. 4 is a flowchart of a process, according to the first embodiment.

FIG. 6 is a flowchart of a process, according to a second embodiment.

FIG. 13A is a timing diagram of the process, according to the fifth embodiment.

FIG. 13B is another timing diagram of the process, according to the fifth embodiment.

FIG. 14 illustrates an overlap ratio.

DESCRIPTION OF THE EMBODIMENTS

Figure 1:
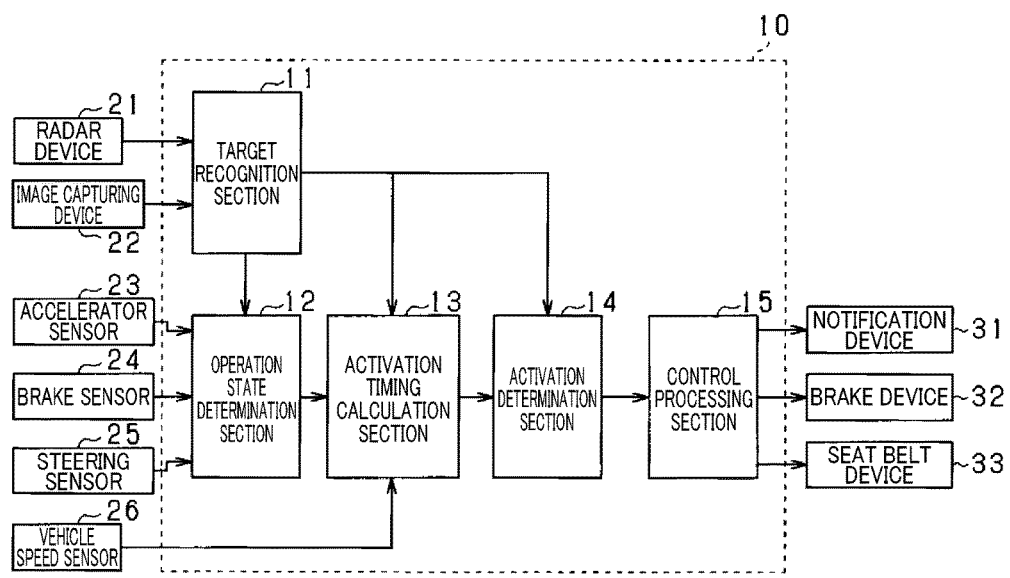
FIG. 1 shows a configuration of a driving assist apparatus.

Embodiments will be described with reference to the accompanying drawings. In the following embodiments, the same or equivalent parts are given the same reference numerals in the drawings and descriptions of the parts given the same reference numerals are referred to.

<First Embodiment>

A driving assist apparatus of the present embodiment is onboard a vehicle (own vehicle). The driving assist apparatus detects a target around the own vehicle (such as a target ahead of the own vehicle in its direction of travel), and performs a driving assist process (driving assist method) described later. This allows the driving assist apparatus to perform control for avoiding a collision between the detected target and the own vehicle or reducing damage from the collision. Thus, the driving assist apparatus of the present embodiment functions as a PCS system.

FIG. 1 shows a configuration of the driving assist apparatus of the present embodiment. As shown in FIG. 1, a driving assist ECU 10, which is the driving assist apparatus of the present embodiment, is a computer including a CPU, a memory (for example, ROM and RAM), and I/O. The driving assist ECU 10 includes functions that are a target recognition section 11, an operation state determination section 12, an activation timing calculation section 13, an activation determination section 14, and a control processing section 15. According to the driving assist ECU 10, the CPU executes a program installed on the ROM, for example, so that each of the functions is realized.

The driving assist ECU 10 is connected to a sensor device that inputs various types of detection information. Examples of the sensor device to be connected to the driving assist ECU 10 include a radar device 21, an image capturing device 22, an accelerator sensor 23, a brake sensor 24, a steering sensor 25, and a vehicle speed sensor 26.

The radar device 21 is, for example, a millimeter wave radar that transmits, as probe waves, a high frequency signal in a millimeter wave band. The radar device 21 is mounted to the front end of the own vehicle. The radar device 21 determines, as a detection region for a target, a region extending over a predetermined angular range, and detects the position of the target in the detection region. Specifically, the radar device 21 transmits probe waves on a predetermined control cycle and receives the reflected waves via a plurality of antennas. Based on a transmission time of the probe waves and a reception time of the reflected wave, the radar device 21 calculates the distance to the target, which has reflected the probe waves. The frequency of waves reflected by the target changes due to the Doppler effect. Accordingly, based on the changed frequency of the reflected waves, the radar device 21 calculates the own vehicle's velocity relative to the target, which has reflected the probe waves. The radar device 21 also calculates cardinal points of the target, which has reflected the probe waves, based on the phase difference between the reflected waves, received via the plurality of antennas. With the position and the cardinal points of the target calculated, the position of the target relative to the own vehicle can be calculated. The radar device 21 transmits probe waves, receives the reflected waves, and calculates the position and velocity of the target relative to the own vehicle on a predetermined control cycle. The radar device 21 then transmits, to the driving assist ECU 10, the calculated relative position and relative velocity per unit time.

The image capturing device 22 is, for example, a CCD camera, a CMOS image sensor, or a near infrared camera. The image capturing device 22 is mounted at a predetermined height from the center of the own vehicle in the lateral direction. The image capturing device 22 captures an image of a region extending ahead of the own vehicle over a predetermined angular range from a bird's-eye perspective. The image capturing device 22 extracts, in the captured image, a characteristic point indicating the presence of a target. Specifically, the image capturing device 22 extracts an edge point, based on information on the brightness of the captured image, and subjects the extracted edge point to a Hough transform. Examples of the characteristic point extracted through the Hough transform include successive edge points on a straight line and a point at which straight lines cross each other at right angles. The image capturing device 22 captures an image and extracts a characteristic point on a control cycle that is the same as or different from that of the radar device 21. The image capturing device 22 then transmits the result of the extraction of the characteristic point to the driving assist ECU 10.

The accelerator sensor 23 is mounted to an accelerator. The accelerator sensor 23 detects the presence or absence of an operation of the accelerator by the driver and an operation amount (accelerator opening degree) of the accelerator. The accelerator sensor 23 then transmits, to the driving assist ECU 10, the results of the detection of the presence or absence of the operation and the operation amount as operation information on an operation performed by the driver.

The brake sensor 24 is mounted to a brake pedal. The brake sensor 24 detects the presence or absence of an operation of the brake pedal by the driver and an operation amount (depression amount) of the brake pedal. The brake sensor 24 then transmits, to the driving assist ECU 10, the results of the detection of the presence or absence of the operation and the operation amount as the operation information on an operation performed by the driver.

The steering sensor 25 is mounted to a steering. The steering sensor 25 detects a steering direction toward which a steering operation has been performed by the driver and an operation amount (steering angle) of the steering operation. The steering sensor 25 then transmits, to the driving assist ECU 10, the results of the detection of the steering direction and the operation amount, as the operation information on an operation performed by the driver.

The vehicle speed sensor 26 is mounted on a rotating shaft that transmits power to wheels of the own vehicle. The vehicle speed sensor 26 detects the speed of the own vehicle based on the number of rotations of the rotating shaft. The vehicle speed sensor 26 then transmits the result of the detection of the speed to the driving assist ECU 10.

The own vehicle includes a notification device 31, a brake device 32, a seat belt device 33, and the like as various safety devices each of which is driven by a control command provided from the driving assist ECU 10.

The notification device 31 is, for example, a loudspeaker, a display, or the like that is provided in the interior of the own vehicle. When the driving assist ECU 10 determines that there is a possibility that the own vehicle will collide with a target, the notification device 31 notifies the driver of a risk of collision by outputting, for example, an alarm sound and/or an alarm message, based on a control command provided from the driving assist ECU 10.

The brake device 32 is a braking device that performs braking of the own vehicle. When the driving assist ECU 10 determines that there is a possibility that the own vehicle will collide with a target, the brake device 32 is activated based on a control command provided from the driving assist ECU 10. Specifically, the brake device 32 increases a braking force that is generated in response to a brake operation performed by the driver, or when the driver has not performed a brake operation, the brake device 32 performs automatic braking. That is, the brake device 32 provides the driver with a brake assist function and an automatic brake function.

The seat belt device 33 is a pretensioner (mechanism provided for improved protection of vehicle occupant) for retracting a seat belt provided for each seat of the own vehicle. When the driving assist ECU 10 determines that there is a possibility that the own vehicle will collide with a target, the seat belt device 33 takes preliminary action for retracting the seat belt, based on a control command provided from the driving assist ECU 10. If the collision is unavoidable, the seat belt device 33 retracts the seat belt so that slack is removed. Thus, the seat belt device 33 protects a vehicle occupant such as the driver by securing the vehicle occupant in the seat.

A function section of the driving assist ECU 10 will be described below. The target recognition section 11 of the present embodiment acquires first detection information (result of the calculation of the position) from the radar device 21. The target recognition section 11 acquires second detection information (result of the extraction of the characteristic point) from the image capturing device 22. The target recognition section 11 then associates first position information, which is indicated by the position acquired from the first detection information, with second position information, which is indicated by the characteristic point acquired from the second detection information, in the following manner. The target recognition section 11 associates, as position information on a single target, first position information and second position information, which indicate respective positions close to each other. When a position indicated by the second position information is present near a position indicated by the first position information, a target is highly likely to be actually present at the position indicated by the first position information. The state in which the position of a target has been accurately acquired by the radar device 21 and the image capturing device 22 is referred to as "fusion state". With respect to a target determined to be in the fusion state (target for which first position information and second position information have been associated), the target recognition section 11 determines whether the target has been continuously in the fusion state, with reference to detection history (previous detection position) of the target. If the target recognition section 11 determines that the target has been continuously in the fusion state, it is determined that the target is present at the position. When the target, which has been determined to have continuously been in the fusion state, becomes undetected, the target recognition section 11 determines, with reference to the detection history of the target, that the target has been present at a previous detection position for a predetermined time period.

The target recognition section 11 performs pattern matching with respect to the target, which has been determined to be in the fusion state. Specifically, the target recognition section 11 performs pattern matching with respect to the second detection information, using pattern data which has been prepared in advance for each of conceivable types of target. Based on the result of the pattern matching, the target recognition section 11 determines whether the detected target is a vehicle or a pedestrian (passerby), and associates the result of the determination, as the type of target, with the target. According to the present embodiment, a concept of the pedestrian, which is one of the types of target, can include a bicycle rider.

Then, the target recognition section 11 associates, with the target whose type has been determined, the position and the velocity of the target relative to the own vehicle. The target recognition section 11 calculates, based on the relative position and the relative velocity, a longitudinal velocity that is a relative velocity in the own vehicle's direction of travel and a lateral velocity that is a relative velocity in a direction orthogonal to the own vehicle's direction of travel.

The target recognition section 11 identifies the type of target according to the longitudinal velocity and the lateral velocity and the result of the determination as to whether the target is a vehicle or a pedestrian.

For example, when it is determined that the type of the target is a vehicle, the target recognition section 11 can identify the type of the vehicle as follows. The target recognition section 11 identifies four types of vehicle based on the longitudinal velocity and the lateral velocity. Specifically, the target recognition section 11 distinguishes between a preceding vehicle traveling ahead of the own vehicle in the same direction as the own vehicle's direction of travel and an oncoming vehicle traveling ahead of the own vehicle in a direction opposite to the own vehicle's direction of travel (traveling in an oncoming lane). The target recognition section 11 also distinguishes between a stationary vehicle (stopped vehicle or parked vehicle) standing still ahead of the own vehicle in its direction of travel and a vehicle crossing the road ahead of the own vehicle in its direction of travel.

When it is determined that the type of the target is a pedestrian, the target recognition section 11 can identify the type of the pedestrian as follows. The target recognition section 11 identifies four types of pedestrian based on the longitudinal velocity and the lateral velocity. Specifically, the target recognition section 11 distinguishes between a preceding pedestrian walking ahead of the own vehicle toward the same direction as the own vehicle's direction of travel and an oncoming pedestrian walking ahead of the own vehicle toward a direction opposite to the own vehicle's direction of travel. The target recognition section 11 also distinguishes between a pedestrian standing ahead of the own vehicle in its direction of travel and a pedestrian crossing the road ahead of the own vehicle in its direction of travel.

The type of a target detected based only on the first detection information can be identified as follows. The target recognition section 11 identifies four types of target based on the longitudinal velocity and the lateral velocity. Specifically, the target recognition section 11 distinguishes between a preceding target moving ahead of the own vehicle in the same direction as the own vehicle's direction of travel and an oncoming target moving ahead of the own vehicle in a direction opposite to the own vehicle's direction of travel. The target recognition section 11 also distinguishes between a stationary target standing ahead of the own vehicle in its direction of travel and a target crossing the road ahead of the own vehicle in its direction of travel.

Figure 2:
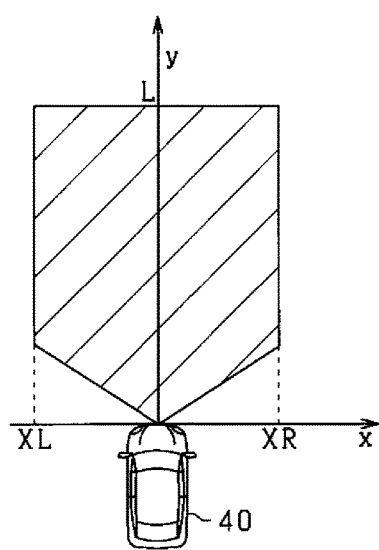
FIG. 2 shows a determination region for which a safety device is activated.

With reference to FIG. 2, the activation determination section 14 of the driving assist ECU 10 will be described. Specifically, a description will be given of a determination process (determination process for determining whether to activate the safety device) that is performed by the activation determination section 14. To simplify the description, FIG. 2 includes an x-axis indicating a position (lateral position) in a lateral direction orthogonal to the direction of travel of an own vehicle 40 and a y-axis indicating a position (longitudinal position) in a longitudinal direction, which is the direction of travel. The activation determination section 14 of the present embodiment sets, as an activation condition for determining whether to activate the safety device, a predetermined determination region (hatched area) ahead of the own vehicle 40 in its direction of travel. That is, according to the driving assist ECU 10 of the present embodiment, the activation determination section 14 functions as a region setting means for setting the activation condition for activating the safety device. The activation determination section 14 sets, for example, a determination region as shown in FIG. 2, based on a rightward limit value XR, a leftward limit value XL, and a forward limit value L (hereinafter referred to as "depth L"). As shown in FIG. 2, the determination region has a predetermined lateral width that is based on the rightward limit value XR and extends ahead of the own vehicle 40 from the center axis of the own vehicle 40 to a right side with respect to the own vehicle 40's direction of travel. The determination region also has a predetermined lateral width that is based on the leftward limit value XL and extends ahead of the own vehicle 40 from the center axis of the own vehicle 40 to a left side with respect to the own vehicle 40's direction of travel. The determination region has a predetermined longitudinal width (depth), which is based on the depth L and extends in the longitudinal direction, that is, the own vehicle 40's direction of travel. The rightward limit value XR and the leftward limit value XL are values that have been determined in advance for each type of target. Accordingly, the activation determination section 14 sets the rightward limit value XR and the leftward limit value XL based on the type of the target. For example, when the target is a preceding vehicle, the target is less likely to suddenly move in the lateral direction, and thus, the activation determination section 14 sets the rightward limit value XR and the leftward limit value XL to values less than values that would be set if the target were highly likely to suddenly move in the lateral direction. When the target is a pedestrian, the target is highly likely to suddenly move in the lateral direction, and thus, the activation determination section 14 sets the rightward limit value XR and the leftward limit value XL to values greater than values that would be set if the target were less likely to suddenly move in the lateral direction. Thus, based on the rightward limit value XR, the leftward limit value XL, and the depth L, the activation determination section 14 sets the determination region for determining whether to activate the safety device ahead of the own vehicle 40 in its direction of travel.

The operation state determination section 12 of the present embodiment determines whether a collision avoidance operation has been performed by the driver. Based on the operation information (result of the detection) provided from the accelerator sensor 23, the brake sensor 24, and the steering sensor 25, the operation state determination section 12 determines whether the driver has performed a collision avoidance operation (whether the driver has decided to avoid a collision). When a target is present around the own vehicle 40, the operation state determination section 12 performs the determination process based on the result of recognition (result of the detection of the target) provided from the target recognition section 11. Thus, according to the driving assist ECU 10 of the present embodiment, the operation state determination section 12 functions as an operation determination means. Then, the activation timing calculation section 13 of the present embodiment calculates an activation timing of the safety device. In this process, the activation timing calculation section 13 calculates a corrected activation timing (hereinafter referred to as "corrected timing") by correcting an initial value (hereinafter referred to as "reference timing"), which has been set in advance. Specifically, the activation timing calculation section 13 calculates a correction value (correction coefficient) for an activation timing, for example, based on detection information (result of the detection of the speed) provided from the vehicle speed sensor 26 and the result of recognition (position and velocity of the target relative to the own vehicle 40) provided from the target recognition section 11. The activation timing calculation section 13 then calculates a corrected timing by correcting the reference timing based on the calculated correction value. When it is determined that a collision avoidance operation has been started by the driver based on the result of the determination (result of the determination of the collision avoidance operation) provided from the operation state determination section 12, the activation timing calculation section 13 performs the calculation process (correction process for correcting the activation timing). Thus, according to the driving assist ECU 10 of the present embodiment, the activation timing calculation section 13 functions as an activation timing calculation means. The reference timing for the safety device is set in advance for each safety device, for example, for each of the safety devices, including the notification device 31, the brake device 32, and the seat belt device 33. Specifically, for example, an earliest activation timing is set for the notification device 31 among the safety devices. This is because if the driver notices a possibility of a collision by being notified by the notification device 31 and depresses the brake pedal, a collision can be avoided without a control command provided from the driving assist ECU 10 to the brake device 32. In regard to the brake device 32, the activation timing is set for each of the brake assist function and the automatic brake function of the brake device 32. Values for the activation timings of the brake assist function and the automatic brake function of the brake device 32 can be the same values or different values.

The activation determination section 14 determines whether to activate the safety device, based on the activation timing of the safety device calculated by the activation timing calculation section 13 and TTC, which is an estimate of the time remaining until the own vehicle 40 collides with the target. The activation determination section 14 calculates TTC remaining until the own vehicle 40 collides with the target, based on a longitudinal velocity and a longitudinal position that have been acquired from the target recognition section 11. In this process, according to the driving assist ECU 10 of the present embodiment, the activation determination section 14 functions as a collision prediction means. The TTC can also be calculated using a relative acceleration instead of the longitudinal velocity. The depth L of the determination region is determined based on the activation timing of the safety device and the relative velocity between the own vehicle 40 and the target. This is because a distance can be calculated by multiplying the activation timing by the relative velocity (time×velocity). That is, when the target is located in the determination region, it means that the TTC has reached the activation timing (TTC≤activation timing). Accordingly, the activation determination section 14 determines whether to activate the safety device, based on the result of the determination as to whether the activation timing has reached the TTC (whether the target is located in the determination region). If the activation timing has reached the TTC (the target is located in the determination region), the activation determination section 14 determines to activate the safety device. If, however, the activation timing has not reached the TTC (the target is located outside the determination region), the activation determination section 14 determines not to activate the safety device. When the activation determination section 14 determines to activate the safety device, the activation determination section 14 transmits the result of the determination (activation determination signal) to the control processing section 15. In response to this, the control processing section 15 of the present embodiment transmits a control signal to the safety device to be activated, based on the received result of the determination. This activates the safety device. Thus, according to the driving assist ECU 10 of the present embodiment, the activation determination section 14 and the control processing section 15 function in cooperation as an activation determination means.

For example, when the own vehicle 40 and the target approach each other, so that the TTC becomes short, the TTC first reaches the activation timing of the notification device 31. At this time, the activation determination section 14 transmits an activation determination signal for the notification device 31 to the control processing section 15. Based on the received activation determination signal, the control processing section 15 transmits a control command signal to the notification device 31. Consequently, the notification device 31 is activated to notify the driver of a risk of collision.

When the own vehicle 40 and the target further approach each other while the driver is not depressing the brake pedal after the notification device 31 has been activated, so that the TTC becomes even shorter, the TTC reaches the activation timing of the automatic brake function of the brake device 32. At this time, the activation determination section 14 transmits an activation determination signal for the automatic brake function to the control processing section 15. Based on the received activation determination signal, the control processing section 15 transmits a control command signal to the brake device 32 and the seat belt device 33. Consequently, the automatic brake function of the brake device 32 is activated to control braking of the own vehicle 40, and the seat belt device 33 is activated to take preliminary action for retracting the seat belt.

When the TTC becomes even shorter while the driver is depressing the brake pedal, the TTC reaches the activation timing of the brake assist function of the brake device 32. At this time, the activation determination section 14 transmits an activation determination signal for the brake assist function to the control processing section 15. Based on the received activation determination signal, the control processing section 15 transmits a control command signal to the brake device 32 and the seat belt device 33. Consequently, the brake assist function of the brake device 32 is activated to perform control of increasing a braking force with respect to a depression amount of the brake pedal by the driver, and the seat belt device 33 is activated to take preliminary action for retracting the seat belt.

The above-described activation of the safety device may cause the following problem. For example, when the safety device is activated even though the driver has performed a collision avoidance operation such as an accelerator operation, a brake operation, or a steering operation, the driver may be annoyed by the activation of the safety device. According to the driving assist ECU 10 of the present embodiment, the activation timing calculation section 13 corrects the activation timing of the safety device and performs a process for delaying the activation timing (delaying process for delaying the activation timing of the safety device) according to the corrected timing. When a collision avoidance operation has been performed by the driver, the activation timing calculation section 13 performs a process for delaying the activation timing of the safety device as compared with a case where no collision avoidance operation has been performed. Specifically, the activation timing calculation section 13 calculates a corrected timing, which is a value less than that of the reference timing. For example, in the case where 2.0 [seconds] is set as the reference timing, the activation timing calculation section 13 performs a process for calculating a corrected timing (time period shorter than reference time period) of 1.7 [seconds]. The activation timing calculation section 13 transmits a value of the calculated corrected timing to the activation determination section 14. In response to this, the activation determination section 14 determines whether to activate the safety device, based on the corrected activation timing. That is, the activation timing is a value that is compared with the TTC when it is determined whether the safety device can be activated. In the determination of whether the safety device can be activated, in the case where the activation timing has reached the TTC, it is determined to activate the safety device. Accordingly, setting of the activation timing to a smaller value as described above decreases the TTC for which the safety device is activated. This extends the time remaining until the activation timing has reached the TTC. This consequently delays activation of the safety device. Thus, according to the driving assist ECU 10 of the present embodiment, the activation timing calculation section 13 functions as a delaying means.

Figure 3:
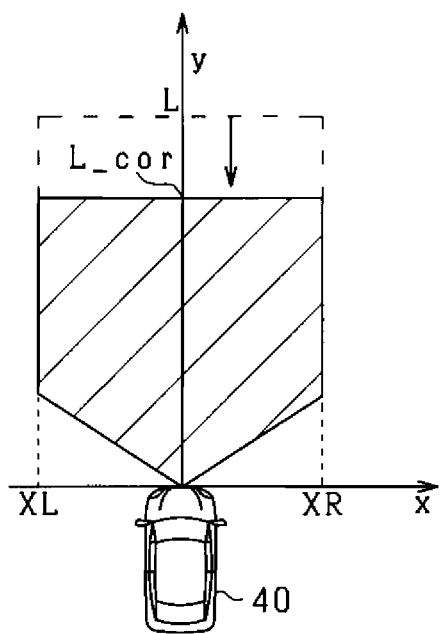
FIG. 3 shows a determination region for a case where a delaying process for delaying an activation timing has been performed, according to a first embodiment.

FIG. 3 shows a determination region for a case where the delaying process for delaying the activation timing according to the present embodiment has been performed. As shown in FIG. 3, according to the determination region, by delaying the activation timing, the depth L, which is a value obtained by multiplying the activation timing by the relative velocity (time×velocity=distance), is caused to be L_cor (corrected depth). That is, according to the determination region for a case where the delaying process for delaying the activation timing has been performed, the longitudinal width (depth) becomes narrower and a region in the longitudinal direction is narrowed. Accordingly, it takes more time (it requires more time) before it is determined that the target is located in the determination region (before the target enters the region).

Thus, by performing the delaying process for delaying the activation timing, in a case where a collision avoidance operation has been performed by the driver, activation of the safety device is delayed as compared with a case where no collision avoidance operation has been performed. For example, in a case where due to a collision avoidance operation performed by the driver, the relative velocity between the own vehicle 40 and the target decrease, so that the TTC becomes longer, the target moves to outside the determination region, or the like, a possibility that the own vehicle 40 will collide with the target is eliminated. Accordingly, the safety device is not activated for such a target.

According to the driving assist ECU 10, when the safety device has already been activated, the delaying process for delaying the activation timing of the safety device is not performed. For example, in a case where an operation intervention by the driver occurs after the safety device is unintentionally activated, the activation timing is delayed. In such a case, therefore, no delaying process is performed in order to prevent the activation of the safety device from being suspended.

FIG. 4 is a flowchart of a process according to the present embodiment. With reference to FIG. 4, a description will be given of a series of processes (a series of processes performed by the driving assist ECU 10) for determining whether to activate the safety device after the activation timing is delayed as described above. The series of processes shown in FIG. 4 are performed on a predetermined control cycle, with respect to each target located ahead of the own vehicle 40 in its direction of travel.

First, according to the driving assist ECU 10, the target recognition section 11 performs a recognition process for recognizing a target (S101). Specifically, the target recognition section 11 performs the recognition process, based on first detection information (result of the calculation of the position) provided from the radar device 21 and second detection information (result of the extraction of the characteristic point) provided from the image capturing device 22. Then, according to the driving assist ECU 10, the activation determination section 14 calculates, for the recognized target, TTC remaining until the distance of the target relative to the own vehicle 40 becomes zero (S102). At this step, the activation determination section 14 performs the calculation process, based on a longitudinal velocity and a longitudinal position that have been acquired from the target recognition section 11. Then, according to the driving assist ECU 10, the activation timing calculation section 13 acquires a reference timing (initial value of activation timing) for activating the safety device (S103). The reference timing is, for example, a value that is stored in a predetermined storage area of the memory of the driving assist ECU 10 and has been set in advance for each safety device. Accordingly, the activation timing calculation section 13 acquires the reference timing by reading relevant data from the memory. Then, according to the driving assist ECU 10, the operation state determination section 12 acquires, from the accelerator sensor 23, operation information on an operation of the accelerator by the driver (S104). For convenience, the process will be hereinafter described using, as an example, a case where the results of detection of the presence or absence of an operation of the accelerator and an operation amount are acquired as operation information on a collision avoidance operation performed by the driver. That is, in the present embodiment, a description will be given of a process based on the accelerator operation, which is one of the collision avoidance operations performed by the driver.

Based on the acquired operation information, the operation state determination section 12 determines whether a collision avoidance operation has been performed by the driver. Specifically, based on the operation information, the operation state determination section 12 determines whether the operation performed by the driver is an operation (collision avoidance operation) of switching the accelerator from ON to OFF (S105). The operation state determination section 12 may be configured to make an affirmative determination when, for example, an operation amount (accelerator opening degree) of the accelerator acquired in the preceding control cycle (the process performed last time) is less than an operation amount of the accelerator acquired in the current control cycle (the process performed this time). Alternatively, the operation state determination section 12 may be configured to make an affirmative determination on condition that, for example, the accelerator has been in an ON state in the preceding control cycle and the accelerator is in an OFF state in the current control cycle. If the operation state determination section 12 determines that the operation performed by the driver is the operation of switching the accelerator from ON to OFF (if the operation state determination section 12 determines that a collision avoidance operation has been performed: YES at S105), control proceeds to step S106. The operation state determination section 12 turns ON a correction condition (control value for whether to make a correction) for activation timing of the safety device (S106). The operation state determination section 12 then sets a counter T (T=1), which indicates progress of the state (S107).

If the operation state determination section 12 determines that the operation performed by the driver is not the operation of switching the accelerator from ON to OFF (if the operation state determination section 12 determines that no collision avoidance operation has been performed; NO at S105), control proceeds to step S108. The operation state determination section 12 determines whether a value of the counter T is greater than zero and less than an upper limit value Tmax (0<T<Tmax) (S108). Examples of a case where it is determined that the operation performed by the driver is not the operation of switching the accelerator from ON to OFF include a case where the accelerator is maintained in the ON/OFF state and a case where the accelerator is switched from OFF to ON. For example, if the determination process at S105 has resulted in an affirmative determination in the preceding control cycle, a value of the counter T is 1. In the current control cycle, therefore, the determination process at S108 results in an affirmative determination.

If the operation state determination section 12 determines that a value of the counter T is greater than zero and less than the upper limit value Tmax (YES at S108), control proceeds to step S109. Based on the operation information, the operation state determination section 12 determines whether the operation performed by the driver is an operation of switching the accelerator from OFF to ON (S109). The operation state determination section 12 may be configured to make an affirmative determination when, for example, an operation amount acquired in the current control cycle is greater than an operation amount acquired in the preceding control cycle. Alternatively, the operation state determination section 12 may be configured to make an affirmative determination on condition that, for example, the accelerator has been in the OFF state in the preceding control cycle and the accelerator is in the ON state in the current control cycle. In the determination process at the step S109, the operation state determination section 12 determines whether the collision avoidance operation performed by the driver has been suspended and an operation that increases the probability of a collision has been performed.

If the operation state determination section 12 determines that the operation performed by the driver is the operation of switching the accelerator from OFF to ON (if the operation state determination section 12 determines that an operation that increases the probability of a collision has been performed; YES at S109), control proceeds to step S110. The operation state determination section 12 turns OFF the correction condition (S110). The operation state determination section 12 then initializes the counter T (T=0) (S111). If the operation state determination section 12 determines that the operation performed by the driver is not the operation of switching the accelerator from OFF to ON (if the operation state determination section 12 determines that no operation that increases the probability of a collision has been performed: NO at S109), control proceeds to step S112. The operation state determination section 12 turns ON the correction condition (S112). The operation state determination section 12 then counts up a value of the counter T (T=T+1) (S113).

If the operation state determination section 12 determines that a value of the counter T is zero or a value of the counter T is the upper limit value Tmax (NO at S108), control proceeds to step S114. The operation state determination section 12 turns OFF the correction condition (S114). The operation state determination section 12 then initializes the counter T (S115). Examples of a case where the determination process at S108 results in a negative determination include a case where the process at S113 has been performed over a predetermined number of consecutive cycles, a case where the process at S111 has been performed in the preceding control cycle, and a case where the process at S115 has been continuously performed.

According to the driving assist ECU 10, the activation timing calculation section 13 calculates an activation timing of the safety device, based on the result of setting (control value in ON/OFF state) of the correction condition (S116). If the correction condition is in an ON state, the activation timing calculation section 13 calculates a corrected timing, based on the reference timing acquired in the process at S103 and uses the calculated corrected timing as the result of the calculation of the activation timing. Specifically, the activation timing calculation section 13, for example, divides the reference timing by the correction value and uses the divided value as the result of the calculation of the corrected timing. If the correction condition is in an OFF state, the activation timing calculation section 13 uses the reference timing as the result of the calculation of the activation timing. Then, according to the driving assist ECU 10, the activation determination section 14 compares values of the TTC calculated in the process at S102 and the activation timing calculated by the activation timing calculation section 13, and determines whether to activate the safety device (S117). Specifically, the activation determination section 14 determines whether the TTC is not greater than the activation timing (TTC≤activation timing), and based on the result of the determination (result of the comparison), the activation determination section 14 determines whether to activate the safety device. If the activation determination section 14 determines that the TTC is not greater than the activation timing (YES at S117), the activation determination section 14 determines that the TTC has reached the activation timing, and control proceeds to step S118. The activation determination section 14 activates the safety device and performs a driving assist function (S118). The activation determination section 14 then ends the series of processes. At this time, the activation determination section 14 transmits the result of the determination (activation determination signal) to the control processing section 15. Based on the received result of the determination, the control processing section 15 transmits a control signal to the safety device to be activated. This activates the safety device. If the activation determination section 14 determines that the TTC is greater than the activation timing (NO at S117), the activation determination section 14 determines that the TTC has not reached the activation timing, and then the activation determination section 14 ends the series of processes at this point.

Figure 5A:
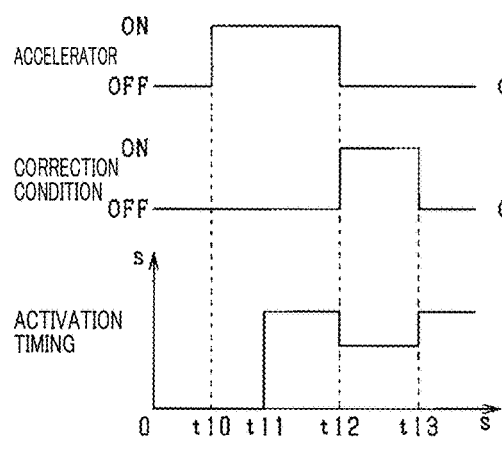
FIG. 5A is a timing diagram of the process, according to the first embodiment.
Figure 5B:
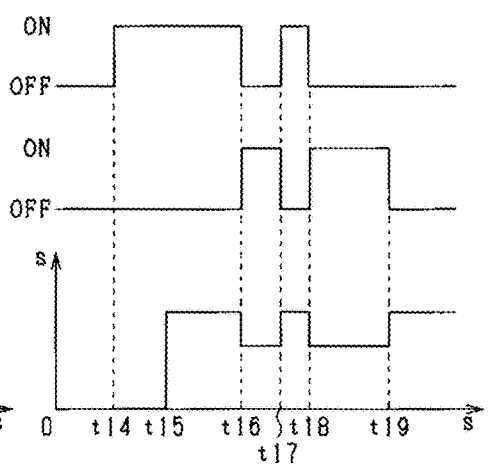
FIG. 5B is another timing diagram of the process, according to the first embodiment.

Figs. 5A and 5B are timing diagrams of the process according to the present embodiment. With reference to FIGS. 5A and 5B a description will be given of an activation timing of the safety device when the process is performed.

FIG. 5A shows an example case where the driver has performed an operation of switching the accelerator from ON to OFF only once. First, at t10, the accelerator is turned ON. Then, at 01, a target is recognized ahead of the own vehicle 40 in its direction of travel and the reference timing is set as the activation timing of the safety device. Then, in order to avoid a collision with the recognized target, at t12, the driver turns OFF the accelerator. In response to this, at t12, the correction condition for activation timing is turned ON and the activation timing is set to the corrected timing whose value is less than that of the reference timing. Thus, at t12, the determination process at S105 (determination of whether the accelerator has been switched from ON to OFF) results in an affirmative determination.

Then, until t13, the correction condition for activation timing is in the ON state and a process for setting the activation timing to the corrected timing continues. In this time period (t12 to t13), the determination process at S105 results in a negative determination and the determination process at S108 (determination of whether a value of the counter T is greater than zero and less than the upper limit value Tmax) results in an affirmative determination. Furthermore, the determination process at S109 (determination of whether the accelerator has been switched from OFF to ON) results in a negative determination, and such a state continues. Then, at t13, a value of the counter T reaches the upper limit value Tmax. At t13, therefore, the determination process at S108 results in a negative determination. Consequently, the correction condition is turned OFF and the activation timing is set back to the reference timing.

FIG. 5B shows an example case where the driver has performed an operation of switching the accelerator from OFF to ON while the correction condition for activation timing has been in the ON state. First, at t14, the accelerator is turned ON. Then, at t15, a target is recognized ahead of the own vehicle 40 in its direction of travel and the reference timing is set as the activation timing of the safety device. Then, in order to avoid a collision with the recognized target, at t16, the driver turns OFF the accelerator. In response to this, at t16, the correction condition for activation timing is turned ON and the activation timing is set to the corrected timing whose value is less than that of the reference timing. This state (the correction condition for activation timing in the ON state and the process for setting the activation timing to the corrected timing) continues until t17.

At t17, while the correction condition is in the ON state, the driver turns ON the accelerator again. Thus, if an operation of switching the accelerator from OFF to ON has been performed after the target has been recognized, it is determined that an operation that increases the probability of a collision has been performed. In response to this, at t17, the correction condition for activation timing is turned OFF and a process for setting the activation timing back to the reference timing is performed. At t17, the determination process at S109 results in an affirmative determination. Consequently, the counter T is initialized (T=0).

Then, at t18, while the accelerator is maintained in the ON state, the driver turns OFF the accelerator again. Thus, when an operation of switching the accelerator from ON to OFF has been performed, the correction condition for activation timing is turned ON again and a process for setting the activation timing to the corrected timing is performed. This state (the correction condition for activation timing in the ON state and the process for setting the activation timing to the corrected timing) continues until t19. At t19, a value of the counter T reaches the upper limit value Tmax. Consequently, the correction condition is turned OFF and the activation timing is set back to the reference timing. Note that a time period from t12 to t13 shown in FIG. 5A is equal in length to a time period from t18 to t19 shown in FIG. 5B.

The configuration of the driving assist apparatus (driving assist ECU 10) of the present embodiment produces the following effects.

According to the driving assist apparatus of the present embodiment, the correction condition for activation timing of the safety device is set (ON/OFF) based on a collision avoidance operation (for example, an operation of switching the accelerator from ON to OFF) performed by the driver. According to the driving assist apparatus, therefore, it is determined whether the driver has decided to avoid a collision, and the activation timing of the safety device can be delayed (changed) according to the driver's decision. This allows the driving assist apparatus of the present embodiment to prevent unnecessary activation of the safety device. Furthermore, according to the driving assist apparatus of the present embodiment, the activation timing is set to the corrected timing until the predetermined time period elapses after a collision avoidance operation (operation of switching the accelerator from ON to OFF) has been started by the driver. That is, according to the driving assist apparatus, after the predetermined time period elapses, the delaying process for delaying the activation timing of the safety device ends and the activation timing is set back to the reference timing. This allows the driving assist apparatus of the present embodiment to prevent non-activation of the safety device.

For example, the following problem arises when the driver has performed an operation of switching the accelerator from ON to OFF so that the correction condition for activation timing is turned ON, and the driver performs again an operation of switching the accelerator from OFF to ON while the correction condition is in the ON state. When the own vehicle 40 accelerates with the operation of turning ON the accelerator, for example, the relative distance between the own vehicle 40 and the target decreases, and the relative velocity between the own vehicle 40 and the target changes so that the own vehicle 40 and the target approach each other. In these cases, the probability of a collision increases. According to the driving assist apparatus of the present embodiment, when the driver has performed an operation of turning ON the accelerator, the correction condition for activation timing is turned OFF. This allows the driving assist apparatus of the present embodiment to prevent non-activation of the safety device even in a situation where the driver has performed the operation as described above.

<Second Embodiment>

The driving assist apparatus of the present embodiment has the same overall configuration as the driving assist apparatus of the first embodiment. The driving assist apparatus of the present embodiment differs from the driving assist apparatus of the first embodiment in that the driving assist apparatus of the present embodiment performs a delaying process for delaying an activation timing of the safety device based on a brake operation.

FIG. 6 is a flowchart of a process according to the present embodiment. With reference to FIG. 6, a description will be given of a series of processes performed by the driving assist ECU 10 of the present embodiment. The series of processes shown in FIG. 6 are performed on a predetermined control cycle, with respect to each target located ahead of the own vehicle 40 in its direction of travel. For convenience, the following description of the series of processes will be simplified by referring to the description of the first embodiment.

First, according to the driving assist ECU 10, the target recognition section 11 performs a recognition process for recognizing a target (S201). Then, according to the driving assist ECU 10, the activation determination section 14 calculates, for the recognized target, TTC remaining until the relative distance between the target and the own vehicle 40 becomes zero (S202). Then, according to the driving assist ECU 10, the activation timing calculation section 13 acquires a reference timing (initial value of activation timing) for activating the safety device (S203). Then, according to the driving assist ECU 10, the operation state determination section 12 acquires, from the brake sensor 24, operation information on an operation of the brake pedal by the driver (S204). Note that the series of processes will be described using a case where the results of detection of the presence or absence of an operation of the brake pedal and an operation amount are acquired as operation information on a collision avoidance operation performed by the driver. That is, a process based on the brake operation, which is one of the collision avoidance operations performed by the driver, will be described.

Based on the acquired operation information, the operation state determination section 12 determines whether a collision avoidance operation has been performed by the driver. Specifically, based on the operation information, the operation state determination section 12 determines whether the operation performed by the driver is an operation (collision avoidance operation) of turning ON the brake (S205). The operation state determination section 12 may determine whether a brake operation has been performed based on, for example, the result of determination as to whether an operation amount (depression amount) of the brake pedal is not less than a threshold (whether a depression amount has exceeded a predetermined amount). In that case, the operation state determination section 12 is configured to make an affirmative determination if the operation amount is not less than the threshold. Consequently, if the operation state determination section 12 determines that the operation performed by the driver is the operation of turning ON the brake (if the operation state determination section 12 determines that a collision avoidance operation has been performed; YES at S205), control proceeds to step S206. The operation state determination section 12 turns ON a correction condition (control value for whether to make a correction) for activation timing of the safety device (S206). The operation state determination section 12 then sets a counter T (T=1), which indicates progress of the state (S207).

If the operation state determination section 12 determines that the operation performed by the driver is not the operation of turning ON the brake (if the operation state determination section 12 determines that no collision avoidance operation has been performed; NO at S205), control proceeds to step S208. The operation state determination section 12 determines, based on the operation information, whether the operation performed by the driver is an operation of switching the brake from ON to OFF (S208). For example, if the determination process at S205 has resulted in an affirmative determination in the preceding control cycle, the determination process at S208 results in an affirmative determination. If, however, the determination process at S205 has resulted in a negative determination in the preceding control cycle, the determination process at S208 results in a negative determination.

If the operation state determination section 12 determines that the operation performed by the driver is the operation of switching the brake from ON to OFF (if the operation state determination section 12 determines that the collision avoidance operation has been suspended: YES at S208), control proceeds to step S209. The operation state determination section 12 turns ON the correction condition (S209). The operation state determination section 12 then sets the counter T (T=1) (S210). If, however, the operation state determination section 12 determines that the operation performed by the driver is not the operation of switching the brake from ON to OFF (if the operation state determination section 12 determines that the collision avoidance operation has not been suspended; NO at S208), control proceeds to step S211. The operation state determination section 12 determines whether a value of the counter T is greater than zero and less than the upper limit value Tmax (0<T<Tmax) (S211). For example, if the determination process at S205 has resulted in an affirmative determination in the preceding control cycle, a value of the counter T is 1. In the current control cycle, therefore, the determination process at S211 results in an affirmative determination.

If the operation state determination section 12 determines that a value of the counter T is greater than zero and less than the upper limit value Tmax (YES at S211), control proceeds to step S212. The operation state determination section 12 turns ON the correction condition (S212). The operation state determination section 12 then counts up a value of the counter T (T=T+1) (S213).

If the operation state determination section 12 determines that a value of the counter T is zero or a value of the counter T is the upper limit value Tmax (NO at S211), control proceeds to step S214. The operation state determination section 12 turns OFF the correction condition (S214). The operation state determination section 12 then initializes the counter T (T=0) (S215). Examples of a case where the determination process at S211 results in a negative determination include a case where the process at S213 has been performed over a predetermined number of consecutive cycles and a case where the process at S215 has been continuously performed.

According to the driving assist ECU 10, the activation timing calculation section 13 calculates an activation timing of the safety device based on the result of setting (control value in ON/OFF state) of the correction condition (S216). At this step, if the correction condition is in the ON state, the activation timing calculation section 13 calculates a corrected timing based on the reference timing acquired in the process at S203 and uses the calculated corrected timing as the result of the calculation of the activation timing. If the correction condition is in the OFF state, the activation timing calculation section 13 uses the reference timing as the result of the calculation of the activation timing. Then, according to the driving assist ECU 10, the activation determination section 14 compares values of the TTC calculated in the process at S202 and the activation timing calculated by the activation timing calculation section 13, and determines whether to activate the safety device (S217). If the activation determination section 14 determines that the TTC is not greater than the activation timing (YES at S217), the activation determination section 14 determines that the TTC has reached the activation timing, and control proceeds to step S218. The activation determination section 14 activates the safety device and performs the driving assist function (S218). The activation determination section 14 then ends the series of processes. At this time, the activation determination section 14 transmits the result of the determination (activation determination signal) to the control processing section 15. Based on the received result of the determination, the control processing section 15 transmits a control signal to the safety device to be activated. This activates the safety device. If, however, the activation determination section 14 determines that the TTC is greater than the activation timing (NO at S217), the activation determination section 14 determines that the TTC has not reached the activation timing, and then the activation determination section 14 ends the series of processes at this point.

Figure 7A:
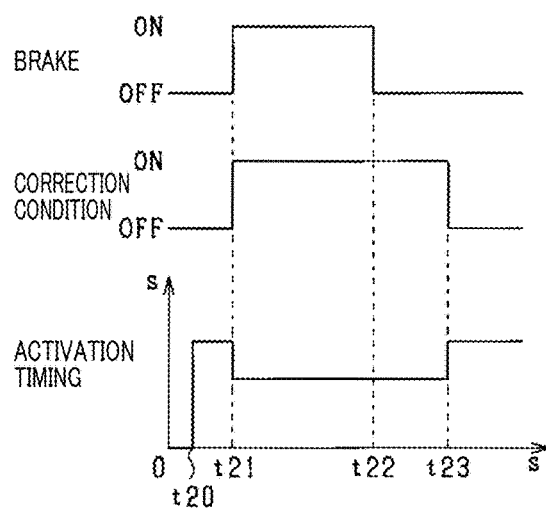
FIG. 7A is a timing diagram of the process, according to the second embodiment.
Figure 7B:
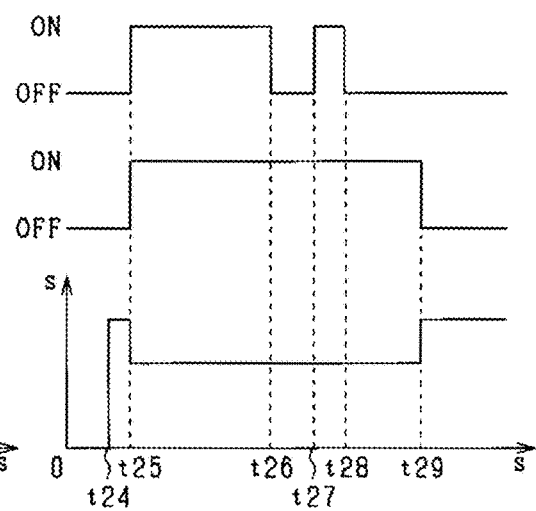
FIG. 7B is another timing diagram of the process, according to the second embodiment.

Figs. 7A and 7B are timing diagrams of the process according to the present embodiment. With reference to FIGS. 7A and 7B, a description will be given of an activation timing of the safety device when the process is performed.

FIG. 7A shows an example case where a brake operation performed by the driver is finished without being suspended. First, at t20, a target is recognized ahead of the own vehicle 40 in its direction of travel and the reference timing is set as the activation timing of the safety device. Then, in order to avoid a collision with the recognized target, at t21, the driver turns ON the brake. In response to this, at t21, the correction condition for activation timing is turned ON and the activation timing is set to the corrected timing whose value is less than that of the reference timing. At t21, the determination process at S205 (determination of whether the brake has been turned ON) results in an affirmative determination. Consequently, the counter T is set (T=1).

The state in which the determination process at S205 results in an affirmative determination continues until the brake is turned OFF. Then, at t22, the driver turns OFF the brake. In response to this, at t22, the determination process at S205 results in a negative determination and the determination process at S208 (determination of whether the brake has been switched from ON to OFF) results in an affirmative determination. At t22, therefore, the correction condition is maintained in the ON state. Then, until t23, the correction condition for activation timing is in the ON state and a process for setting the activation timing to the corrected timing is continuously performed. In this time period (time period from t22 to t23), the determination process at S205 results in a negative determination and the determination process at S208 results in a negative determination. Furthermore, the determination process at S211 (determination of whether a value of the counter T is greater than zero and less than the upper limit value Tmax) results in an affirmative determination, and such a state continues. Then, at t23, a value of the counter T reaches the upper limit value Tmax. At t23, therefore, the determination process at S211 results in a negative determination. Consequently, the correction condition is turned OFF and the activation timing is set back to the reference timing.

FIG. 7B shows an example case where the brake operation performed by the driver is suspended, resumed, and then finished. First, at t24, a target is recognized ahead of the own vehicle 40 in its direction of travel and the reference timing is set as the activation timing of the safety device. Then, in order to avoid a collision with the recognized target, at t25, the driver turns ON the brake. In response to this, at t25, the correction condition for activation timing is turned ON and the activation timing is set to the corrected timing whose value is less than that of the reference timing, and this process is continuously performed. Then, at t26, the driver turns OFF the brake. In response to this, at t26, the correction condition is maintained in the ON state, and then counting up of the counter T is started. Then, at t27, the driver turns ON the brake again. At this time, a value of the counter T is less than the upper limit value Tmax. In response to this, at t27, the determination process at S205 results in an affirmative determination. Consequently, the counter T is reset (T=1). Then, at t28, the driver turns OFF the brake again. In response to this, at t28, counting up of the counter T is started. Then, at t29, a value of the counter T reaches the upper limit value Tmax. At t29, therefore, the determination process at S211 results in a negative determination. Consequently, the correction condition is turned OFF and the activation timing is set back to the reference timing.

A time period from t22 to t23 shown in FIG. 7A is equal in length to a time period from t27 to t28 shown in FIG. 7B.

In addition to the effects similar to those of the first embodiment, the configuration of the driving assist apparatus (driving assist ECU 10) of the present embodiment produces the following effects.

For example, in the brake operation performed by the driver, a depression amount (operation amount) of the brake pedal may be temporarily reduced. In that case, if it is determined that the brake operation has finished, and a process for setting the activation timing of the safety device back to the reference timing is performed, unnecessary activation of the safety device may occur. According to the driving assist apparatus of the present embodiment, the activation timing is set to the corrected timing until the predetermined time period elapses after the brake operation performed by the driver has finished. That is, according to the driving assist apparatus, after the predetermined time period elapses after the brake operation has finished, the delaying process for delaying the activation timing of the safety device ends and the activation timing is set back to the reference timing. This allows the driving assist apparatus of the present embodiment to prevent unnecessary activation of the safety device even in a case where the depression amount of the brake pedal is temporarily reduced. Furthermore, according to the driving assist apparatus of the present embodiment, if the depression amount of the brake pedal is continuously reduced for the predetermined time period, the activation timing is set back to the reference timing. That is, according to the driving assist apparatus, after the predetermined time period elapses after the depression amount of the brake pedal has been reduced, the delaying process for delaying the activation timing of the safety device ends and the activation timing is set back to the reference timing. This allows the driving assist apparatus of the present embodiment to prevent non-activation of the safety device even in a case where the depression amount of the brake pedal is temporarily reduced.

<Third Embodiment>

The driving assist apparatus of the present embodiment has the same overall configuration as the driving assist apparatus of the first embodiment. The driving assist apparatus of the present embodiment differs from the driving assist apparatus of the first embodiment in that the driving assist apparatus of the present embodiment performs a delaying process for delaying an activation timing of the safety device based on a steering operation.

Figure 8:
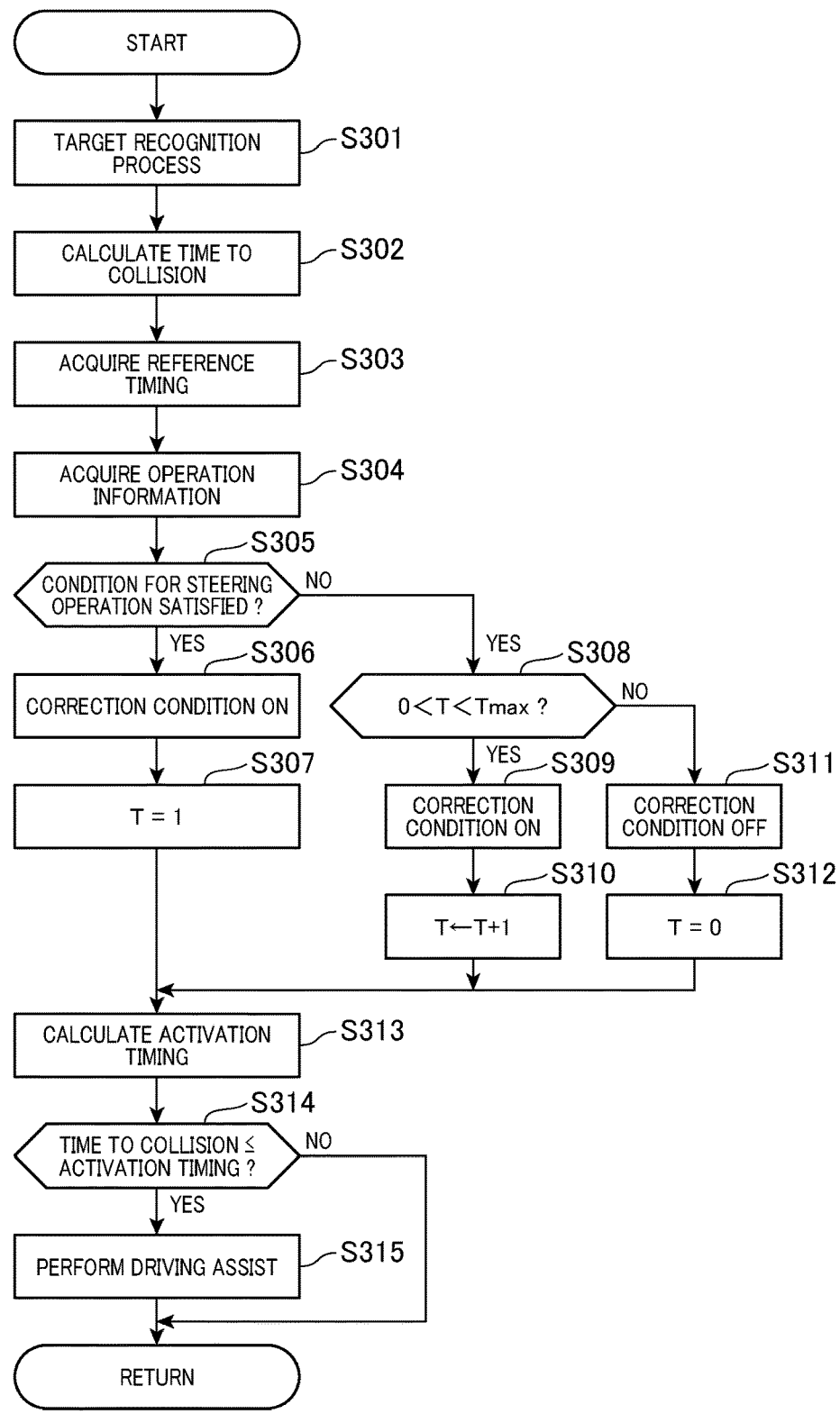
FIG. 8 is a flowchart of a process, according to a third embodiment.

FIG. 8 is a flowchart of a process according to the present embodiment. With reference to FIG. 8, a description will be given of a series of processes performed by the driving assist ECU 10 of the present embodiment. The series of processes shown in FIG. 8 are performed on a predetermined control cycle, with respect to each target located ahead of the own vehicle 40 in its direction of travel. For convenience, the following description of the series of processes will be simplified by referring to the description of the first embodiment.

First, according to the driving assist ECU 10, the target recognition section 11 performs a recognition process for recognizing a target (S301). Then, according to the driving assist ECU 10, the activation determination section 14 calculates, for the recognized target, TTC remaining until the relative distance between the target and the own vehicle 40 becomes zero (S302). Then, according to the driving assist ECU 10, the activation timing calculation section 13 acquires a reference timing (initial value of activation timing) for activating the safety device (S303). Then, according to the driving assist ECU 10, the operation state determination section 12 acquires, from the steering sensor 25, operation information on an operation of the steering by the driver (S304). The series of processes will be hereinafter described using, as an example, a case where the results of detection of the presence or absence of an operation of the steering and an operation amount are acquired as operation information on a collision avoidance operation performed by the driver. That is, in the present embodiment, a process based on the steering operation, which is one of the collision avoidance operations performed by the driver, will be described.

The operation state determination section 12 determines, based on the acquired operation information, whether a collision avoidance operation has been performed by the driver. Specifically, the operation state determination section 12 determines, based on the operation information, whether a condition (collision avoidance condition) for steering operation (collision avoidance operation) has been switched from OFF to ON (whether a condition for steering operation is satisfied) (S305). That is, in the determination process at S305, the operation state determination section 12 determines whether a collision between the own vehicle 40 and the target can be avoided by performing a steering operation. Specifically, the operation state determination section 12 determines, for example, whether an operation amount (steering angle) acquired from the steering sensor 25 is not less than a threshold (whether a steering angle has exceeded a predetermined angle). Furthermore, the operation state determination section 12 determines whether a steering direction toward which the steering operation has been performed is leftward or rightward. The operation state determination section 12 determines the steering direction, for example, using the result of recognition (position and relative velocity between the target and the own vehicle 40) provided from the target recognition section 11. For example, assume that a recognized target is located ahead of the own vehicle 40 on the right side in its direction of travel, and while the target is moving leftward, each of leftward and rightward steering operations has been performed. If the leftward steering operation has been performed when there is such a positional relationship and movement relationship between the own vehicle 40 and the target, it can be determined that the steering operation is not an operation for avoiding a collision with the target. If the rightward steering operation has been performed, it can be determined that the steering operation performed by the driver is the operation for avoiding a collision with the target. Assume that a target is located ahead of the own vehicle 40 on the right side in its direction of travel, and while the target is moving rightward, each of leftward and rightward steering operations has been performed. If the leftward steering operation has been performed when there is such a positional relationship and movement relationship between the own vehicle 40 and the target, it can be determined that the steering operation performed by the driver is the operation for avoiding a collision with the target. If the rightward steering operation has been performed, it can be determined that the steering operation is not the operation for avoiding a collision with the target. Accordingly, if the operation state determination section 12 determines that the steering operation performed by the driver is a steering operation for avoiding a collision with the target, the operation state determination section 12 determines that the condition has been turned ON. If, however, the operation state determination section 12 determines that the steering operation performed by the driver is not the steering operation for avoiding a collision with the target, the operation state determination section 12 determines that the condition has been turned OFF. The same applies to a case where a target is located ahead of the own vehicle 40 on the left side in its direction of travel. If the operation state determination section 12 determines that the condition for steering operation has been switched from OFF to ON (if the operation state determination section 12 determines that the condition for steering operation has been satisfied; YES at S305), control proceeds to step S306. The operation state determination section 12 turns ON the correction condition (control value for whether to make a correction) for activation timing of the safety device (S306). The operation state determination section 12 then sets the counter T (T=1), which indicates progress of the state (S307).

If, however, the operation state determination section 12 determines that the condition for steering operation has not been switched from OFF to ON (if the operation state determination section 12 determines that the condition for steering operation has not been satisfied; NO at S305), control proceeds to step S308. The operation state determination section 12 determines whether a value of the counter T is greater than zero and less than the upper limit value Tmax (0<T<Tmax) (S308). Examples of a case where it is determined that the condition for steering operation has not been switched from OFF to ON include a case where the condition for steering operation is maintained in the ON/OFF state and a case where the condition for steering operation is changed from ON to OFF. For example, if the determination process at S305 has resulted in an affirmative determination in the preceding control cycle (the process performed last time), a value of the counter T is 1. In the current control cycle (the process performed this time), therefore, the determination process at S308 results in an affirmative determination.

If the operation state determination section 12 determines that a value of the counter T is greater than zero and less than the upper limit value Tmax (YES at S308), control proceeds to step S309. The operation state determination section 12 turns ON the correction condition (S309). The operation state determination section 12 then counts up a value of the counter T (T=T+1) (S310).

If the operation state determination section 12 determines that a value of the counter T is zero or a value of the counter T is the upper limit value Tmax (NO at S308), control proceeds to step S311. The operation state determination section 12 turns OFF the correction condition (S311). The operation state determination section 12 then initializes the counter T (T=0) (S312). Examples of a case where the determination process at S308 results in a negative determination include a case where the process at S310 has been performed over a predetermined number of consecutive cycles and a case where the process at S312 has been continuously performed.

According to the driving assist ECU 10, the activation timing calculation section 13 calculates an activation timing of the safety device based on the result of setting (control value in ON/OFF state) of the correction condition (S313). At this step, if the correction condition is in the ON state, the activation timing calculation section 13 calculates a corrected timing based on the reference timing acquired in the process at S303 and uses, as the result of the calculation of the activation timing, the calculated corrected timing. If the correction condition is in the OFF state, the activation timing calculation section 13 uses the reference timing as the result of the calculation of the activation timing. Then, according to the driving assist ECU 10, the activation determination section 14 compares values of the TTC calculated in the process at S302 and the activation timing calculated by the activation timing calculation section 13, and determines whether to activate the safety device (S314). If the activation determination section 14 determines that the TTC is not greater than the activation timing (YES at S314), the activation determination section 14 determines that the TTC has reached the activation timing, and control proceeds to step S315. The activation determination section 14 activates the safety device and performs the driving assist function (S315). The activation determination section 14 then ends the series of processes. At this time, the activation determination section 14 transmits the result of the determination (activation determination signal) to the control processing section 15. Based on the received result of the determination, the control processing section 15 transmits a control signal to the safety device to be activated. This activates the safety device. If, however, the activation determination section 14 determines that the TTC is greater than the activation timing (NO at S314), the activation determination section 14 determines that the TTC has not reached the activation timing, and then the activation determination section 14 ends the series of processes at this point.

Figure 9A:
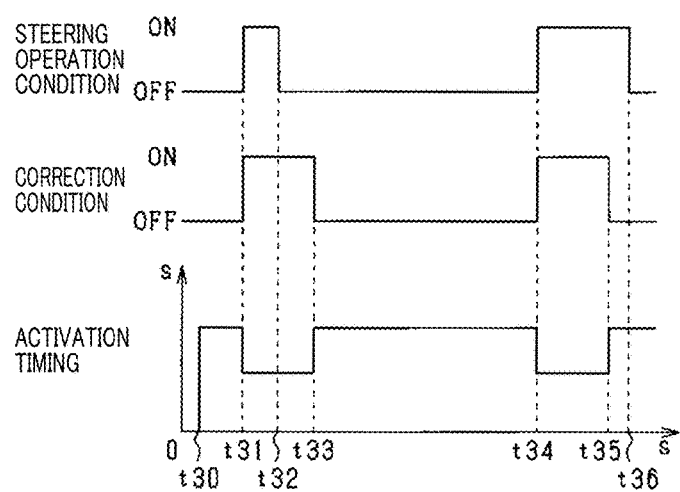
FIG. 9A is a timing diagram of the process, according to the third embodiment.
Figure 9B:
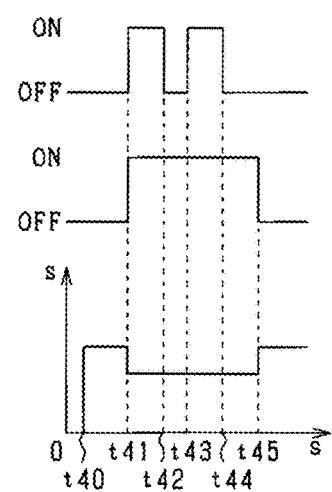
FIG. 9B is another timing diagram of the process, according to the third embodiment.

FIGS. 9A and 9B are timing diagrams of the process according to the present embodiment. With reference to FIGS. 9A and 9B, a description will be given of an activation timing of the safety device when the process is performed.

FIG. 9A shows an example case (example case 1) where a steering operation performed by the driver is finished, resumed, and then finished. First, at t30, a target is recognized ahead of the own vehicle 40 in its direction of travel and the reference timing is set as the activation timing of the safety device. Then, in order to avoid a collision with the recognized target, at t31, the driver performs a steering operation. In response to this, at t31, if the steering operation performed by the driver satisfies the condition (if the condition has been switched from OFF to ON), the correction condition for activation timing is turned ON and the activation timing is set to the corrected timing whose value is less than that of the reference timing. At t31, the determination process at S305 (determination of whether the condition for steering operation has been switched from OFF to ON) results in an affirmative determination. Consequently, the counter T is set (T =1). The state in which the determination process at S305 results in an affirmative determination (state in which the condition for steering operation is satisfied) continues until the condition for steering operation is turned OFF. Then, at t32, although the driver returns to a steering operation in normal driving after the collision avoidance operation, the correction condition is maintained in the ON state, counting up of the counter T is continuously performed, and the activation timing is maintained to be the corrected timing. Then, a value of the counter T reaches the upper limit value Tmax. At t33, therefore, the determination process at S308 (determination of whether a value of the counter T is greater than zero and less than the upper limit value Tmax) results in a negative determination. Consequently, the correction condition is turned OFF, the activation timing is set back to the reference timing, and the counter T is initialized (T=0). Then, at t34, the driver performs again a steering operation that satisfies the condition. In response to this, at t34, the correction condition for activation timing is turned ON and the activation timing is set to the corrected timing. At t34, the determination process at S305 results in an affirmative determination. Consequently, the counter T is set (T=1), and counting up of the counter T is started. The state in which the determination process at S305 results in an affirmative determination continues until the condition for steering operation is turned OFF. Assume that a time period (time period from t34 to t36) for the resumed steering operation is longer (t35 <t36) than a time period (time period from t34 to t35) until a value of the counter T reaches the upper limit. In such a case, a value of the counter T reaches the upper limit value Tmax before t36 at which the steering operation is finished (before the condition for steering operation is turned OFF). At t35, which is before t36, therefore, the determination process at S308 results in a negative determination. Consequently, the correction condition is turned OFF and the activation timing is set back to the reference timing. That is, even though the steering operation is performed until t36, the process for setting the activation timing to the corrected timing ends at t35, which is before t36 at which the steering operation is finished.

FIG. 9B shows an example case (example case 2) where a steering operation performed by the driver is finished, resumed, and then finished. First, at t40, a target is recognized ahead of the own vehicle 40 in its direction of travel and the reference timing is set as the activation timing of the safety device. Then, in order to avoid a collision with the recognized target, at t41, the driver performs a steering operation. In response to this, at t41, if the steering operation performed by the driver satisfies the condition, the correction condition for activation timing is turned ON and the activation timing is set to the corrected timing whose value is less than that of the reference timing. At t41, the determination process at S305 results in an affirmative determination. Consequently, the counter T is set (T=1). The state in which the determination process at S305 results in an affirmative determination continues until the condition for steering operation is turned OFF. Then, at t42, although the driver returns to a steering operation in normal driving after the collision avoidance operation, the correction condition is maintained in the ON state, counting up of the counter T is continuously performed, and the activation timing is maintained to be the corrected timing. Then, at t43, the driver performs again a steering operation that satisfies the condition. In response to this, at t43, the determination process at S305 results in an affirmative determination. Consequently, the counter T is reset (T=1). A time period from t41 to t43 is shorter than a time period until a value of the counter T reaches the upper limit, and in the time period from t41 to t43, the processes at S308 to S310 are performed. Then, at t44, although the steering operation performed by the driver is finished, the correction condition is maintained in the ON state, counting up of the counter T is continuously performed, and the activation timing is maintained to be the corrected timing. Then, a value of the counter T reaches the upper limit value Tmax. At t45, therefore, the determination process at S308 results in a negative determination. Consequently, the correction condition is turned OFF, the activation timing is set back to the reference timing, and the counter T is initialized (T=0). That is, the process for setting the activation timing to the corrected timing is continuously performed until t45.

A time period from t31 to t33 and a time period from t34 to t35 shown in FIG. 9A are equal in length to a time period from t43 to t45 shown in FIG. 9B.

The configuration of the driving assist apparatus (driving assist ECU 10) of the present embodiment produces the following effects.

According to the driving assist apparatus of the present embodiment, the correction condition for activation timing of the safety device is set (ON/OFF) based on a steering operation performed by the driver. According to the driving assist apparatus, therefore, it can be determined whether the driver has decided to avoid a collision, and the activation timing of the safety device can be delayed (changed) according to the driver's decision. This allows the driving assist apparatus of the present embodiment to prevent unnecessary activation of the safety device. Furthermore, according to the driving assist apparatus of the present embodiment, the activation timing is set to the corrected timing until the predetermined time period elapses after a steering operation has been started by the driver. That is, according to the driving assist apparatus, after the predetermined time period elapses, the delaying process for delaying the activation timing of the safety device ends and the activation timing is set back to the reference timing. This allows the driving assist apparatus of the present embodiment to prevent nonactivation of the safety device.

For example, when a steering operation has been performed, the direction of travel of a vehicle changes. Once the steering operation has been performed, a collision of the vehicle with a target can be avoided. According to the driving assist apparatus of the present embodiment, the activation timing is set to the corrected timing whose value is less than that of the reference timing, while the condition for steering operation (collision avoidance condition) is satisfied or until the predetermined time period elapses after the condition has been satisfied. This allows the driving assist apparatus of the present embodiment to appropriately delay the activation timing of the safety device according to a condition of the steering operation performed by the driver.

<Fourth Embodiment>

The driving assist apparatus of the present embodiment has the same overall configuration as the driving assist apparatus of the first embodiment. Furthermore, the driving assist apparatus of the present embodiment performs the same delaying process for delaying an activation timing of the safety device as the third embodiment. The driving assist apparatus of the present embodiment has some differences in a process for setting a determination region for determining whether to activate the safety device.

Figure 10:
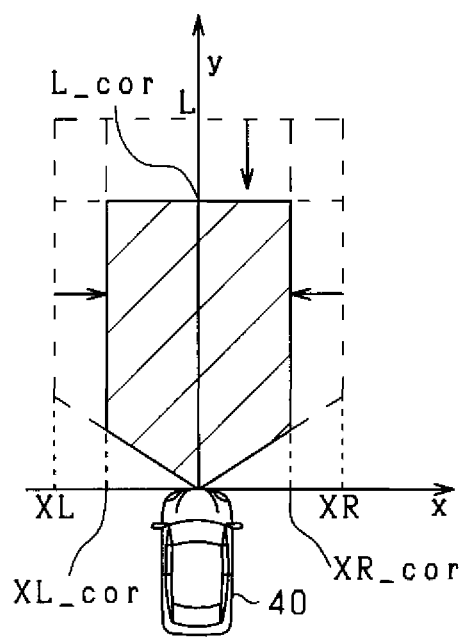
FIG. 10 shows a determination region for a case where a delaying process for delaying an activation timing has been performed, according to a fourth embodiment.

FIG. 10 shows a determination region for a case where a delaying process for delaying an activation timing according to the present embodiment has been performed. When setting a determination region, the driving assist ECU 10 of the present embodiment acquires, from the steering sensor 25, operation information on a steering operation performed by the driver (presence or absence of steering operation). If a steering operation has been performed by the driver, the driving assist ECU 10 corrects a range of the determination region, for example, as shown in FIG. 10. Specifically, the driving assist ECU 10 corrects the rightward limit value XR and leftward limit value XL, which define the lateral width of the determination region, to a rightward corrected limit value XR_cor and leftward corrected limit value XL_cor, which are values less than the original rightward limit value XR and leftward limit value XL, respectively. That is, if a steering operation has been performed by the driver, the driving assist ECU 10 makes a correction so that the lateral width of the determination region is narrowed. The lateral width of the determination region is corrected as follows. That is, for example, the rightward corrected limit value XR_cor and leftward corrected limit value XL_cor are calculated by subtracting correction values from the respective rightward limit value XR and leftward limit value XL. Based on the corrected limit values thus calculated, the lateral width of the determination region is corrected. For example, the correction values for the rightward limit value XR and leftward limit value XL can be set such that a correction amount becomes greater as an operation amount of the steering operation is greater.

A process according to the present embodiment is similar to that of the third embodiment, and the activation timing of the safety device is set to the corrected timing according to the steering operation. Thus, according to the present embodiment, the longitudinal width of the determination region is also corrected. Specifically, a value of the depth L (forward limit value), which defines the longitudinal width of the determination region, is corrected to a forward corrected limit value L_cor, which is a value less than the original forward limit value. That is, if a steering operation has been performed by the driver, the driving assist ECU 10 makes a correction so that the lateral width and the longitudinal width of the determination region are narrowed.

In addition to the effects similar to those of the third embodiment, the configuration of the driving assist apparatus (driving assist ECU 10) according to the present embodiment produces the following effect.

For example, assume that the driver has attempted to avoid a collision between the own vehicle 40 and the target not by performing an accelerator operation or brake operation but only by performing a steering operation. In such a case, the relative position between the own vehicle 40 and the target in the longitudinal direction (longitudinal position of the target relative to the own vehicle 40) decreases as time elapses, and the TTC may reach the activation timing. At this time, the steering operation performed by the driver causes the position of the target to change so as to move leftward or rightward from inside to outside the determination region. According to the driving assist apparatus of the present embodiment, if a steering operation has been performed by the driver, the correction for narrowing the lateral width and the longitudinal width of the determination region is performed. At this time, according to the driving assist apparatus, the rightward limit value XR, the leftward limit value XL, and the depth L (forward limit value) are corrected to smaller values so that the rightward corrected limit value XR_cor, the leftward corrected limit value XL_cor, and the forward corrected limit value L_cor are obtained, respectively. According to the driving assist apparatus, the correction is made by setting the determination region using the rightward corrected limit value XR_cor, the leftward corrected limit value XL_cor, and the forward corrected limit value L_cor. Thus, according to the present embodiment, the longitudinal position of the target relative to the own vehicle 40 becomes shorter as time elapses, and the target is more likely to move leftward or rightward from inside to outside the determination region. According to the driving assist apparatus of the present embodiment, therefore, unnecessary activation of the safety device can be prevented even if a collision avoidance operation by the steering operation has been performed.

<Fifth Embodiment>

The driving assist apparatus of the present embodiment has the same overall configuration as the driving assist apparatus of the first embodiment. The driving assist apparatus of the present embodiment has some differences from the third embodiment in a delaying process for delaying an activation timing of the safety device.

Figure 11:
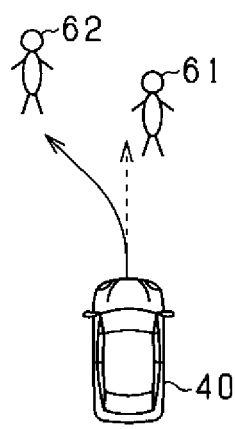
FIG. 11 shows an example in which a plurality of targets are present.

FIG. 11 shows an example in which a plurality of targets are present ahead of the own vehicle 40 in its direction of travel. With reference to FIG. 11, a description will be given of an outline of a process according to the present embodiment. In FIG. 11, a dashed line indicates the direction of travel of the own vehicle 40 and a solid line indicates its direction of travel for a case where a steering operation has been performed. For example, assume that, as shown in FIG. 11, a plurality of targets, namely, a first target 61 and a second target 62, are present ahead of the own vehicle 40 in its direction of travel. Assume further that, at this time, a steering operation toward a direction toward the second target 62 has been performed in the own vehicle 40, so that a collision with the first target 61 has been avoided. In a case where the activation timing of the safety device has been delayed based on such a steering operation, a delay (delay in activation of the safety device) may occur in collision avoidance control for avoiding a collision with the second target 62. According to the present embodiment, the driving assist ECU 10 is configured to switch a subject of a delaying process for delaying an activation timing of the safety device. That is, the driving assist ECU 10 performs, according to a steering operation, a process (hereinafter referred to as "process for selecting a collision avoidance subject") for selecting (changing) a subject (collision avoidance subject that is subject to collision avoidance by a steering operation) of the process for delaying the activation timing.

The process for selecting a collision avoidance subject is performed by the target recognition section 11 of the driving assist ECU 10. The target recognition section 11 of the present embodiment performs the process for selecting a collision avoidance subject, based on a positional relationship between the own vehicle 40 and a target. For example, the target recognition section 11 performs the process for selecting a collision avoidance subject, based on a positional relationship such as that below. Specifically, as the collision avoidance subject, which is subject to collision avoidance by a steering operation, the target recognition section 11 may select, among a plurality of targets, a target whose lateral position (relative position in the lateral direction) relative to the own vehicle 40 is closest to the center axis of the own vehicle 40 in its direction of travel. Alternatively, the target recognition section 11 can select, among a plurality of targets whose lateral positions are within the lateral width of the determination region, a target whose longitudinal position (relative position in the longitudinal direction) to the own vehicle 40 is closest to the front end of the own vehicle 40 in its direction of travel. Alternatively, the target recognition section 11 can calculate a determination parameter by assigning a weight to each value of longitudinal and lateral relative positions (lateral position and longitudinal position) and select, based on the calculated determination parameter, a subject target for which a collision is avoided by a steering operation. Thus, according to the driving assist ECU 10 of the present embodiment, the target recognition section 11 functions as a subject selection means for selecting, among a plurality of targets present around the own vehicle 40, a collision avoidance subject target, which is subject to collision avoidance by a steering operation.

Figure 12:
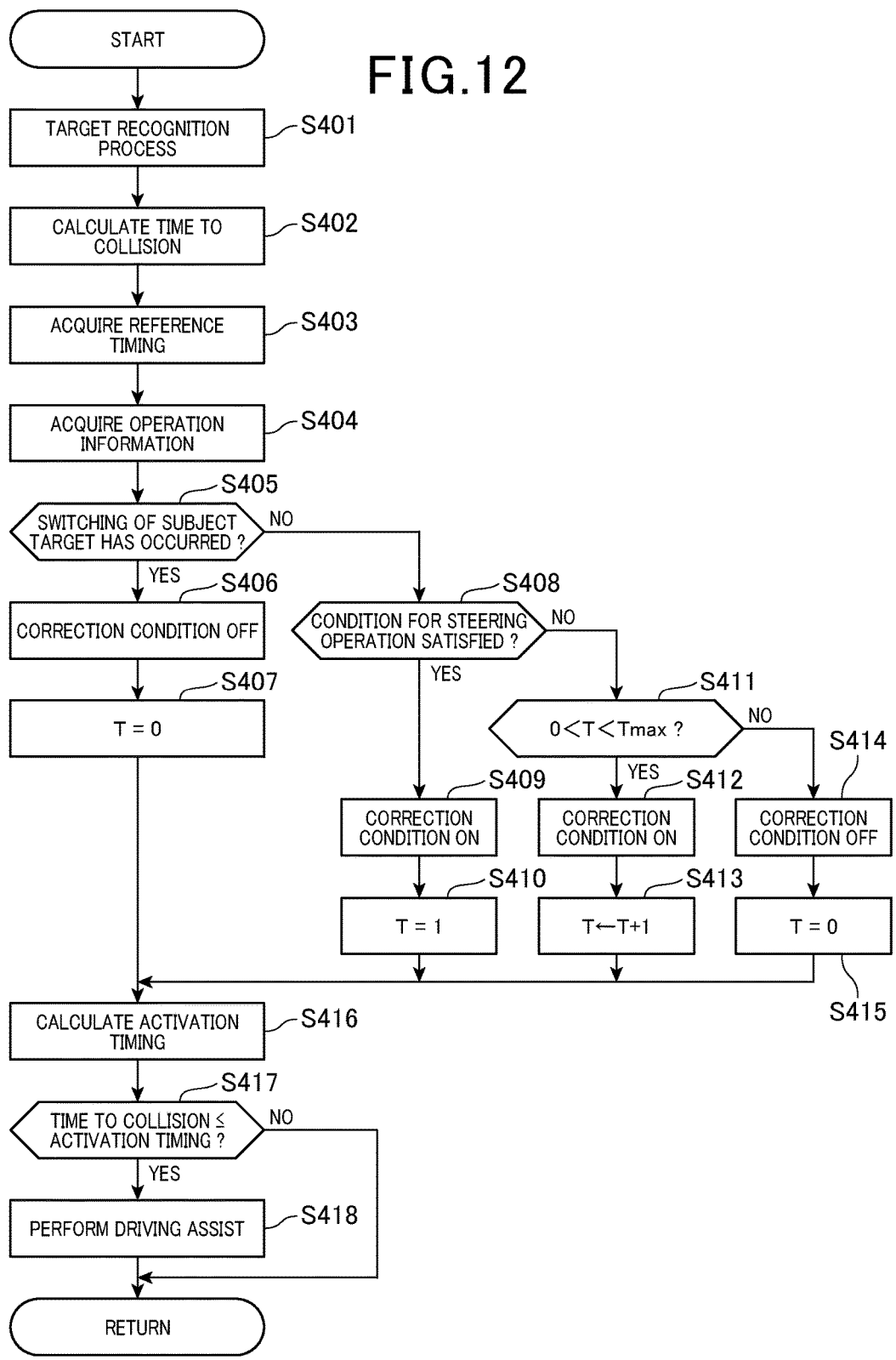
FIG. 12 is a flowchart of a process, according to a fifth embodiment.

FIG. 12 is a flowchart of the process according to the present embodiment. With reference to FIG. 12, a description will be given of a series of processes performed by the driving assist ECU 10 of the present embodiment. The series of processes shown in FIG. 12 are performed on a predetermined control cycle, with respect to each target located ahead of the own vehicle 40 in its direction of travel. For convenience, the following description of the series of processes will be simplified by referring to the description of the third embodiment. First, the driving assist ECU 10 performs processes equivalent to those at S301 to S304 described in the third embodiment (S401 to S404). Then, according to the driving assist ECU 10, the target recognition section 11 determines whether switching of the collision avoidance subject target, which is subject to collision avoidance by a steering operation, has occurred (S405). Specifically, the target recognition section 11 performs a process for selecting a collision avoidance subject, based on a positional relationship between the own vehicle 40 and the target. The target recognition section 11 then determines whether switching of the collision avoidance subject target has occurred, based on the result of determination as to whether the selected target differs from a target in the preceding control cycle (the process performed last time). If the target recognition section 11 determines that switching of the collision avoidance subject target has occurred (YES at S405), control proceeds to step S406. At this time, the target recognition section 11 transmits the result of the determination to the operation state determination section 12. According to the driving assist ECU 10, the operation state determination section 12 turns OFF the correction condition for activation timing of the safety device (control value for whether to make a correction) (S406). The operation state determination section 12 then initializes the counter T (T=0), which indicates progress of the state (S407). If, however, the target recognition section 11 determines that no switching of the collision avoidance subject target has occurred (NO at S405), the operation state determination section 12 processes equivalent to the processes at S305 to S312 described in the third embodiment are performed (S408 to S415). According to the driving assist ECU 10, the activation timing calculation section 13 calculates an activation timing of the safety device based on the result of setting of the correction condition (control value in ON/OFF state) (S416). At this step, if the correction condition is in the ON state, the activation timing calculation section 13 calculates a corrected timing based on the reference timing acquired in the process at S403, and uses, as the result of the calculation of the activation timing, the calculated corrected timing. If the correction condition is in the OFF state, the activation timing calculation section 13 uses the reference timing as the result of the calculation of the activation timing.

Then, according to the driving assist ECU 10, the activation determination section 14 compares values of the TTC calculated in the process at S402 and the activation timing calculated by the activation timing calculation section 13, and determines whether to activate the safety device (S417). If the activation determination section 14 determines that the TTC is not greater than the activation timing (YES at S417), the activation determination section 14 determines that the TTC has reached the activation timing, and control proceeds to step S418. The activation determination section 14 activates the safety device and performs the driving assist function (S418). The activation determination section 14 then ends the series of processes. At this time, the activation determination section 14 transmits the result of the determination (activation determination signal) to the control processing section 15. Based on the received result of the determination, the control processing section 15 transmits a control signal to the safety device to be activated. This activates the safety device. If, however, the activation determination section 14 determines that the TTC is greater than the activation timing (NO at S417), the activation determination section 14 determines that the TTC has not reached the activation timing, and then activation determination section 14 ends the series of processes at this point.

Figs. 13A and 13B are timing diagrams of the process according to the present embodiment. With reference to FIGS. 13A and 13B, a description will be given of an activation timing of the safety device when the process is performed. FIGS. 13A and 13B show, as the result of determination as to whether the condition for steering operation (collision avoidance condition) is satisfied, the result of determination as to whether the condition for the first target 61 is satisfied in the situation shown in FIG. 11.

As shown in FIG. 13A, at t50, the driver performs a steering operation in order to avoid a collision with the first target 61. In response to this, at t51, the correction condition for activation timing is turned ON, and the activation timing is set to the corrected timing whose value is less than that of the reference timing. At t51, the determination process at S408 (determination of whether the condition for steering operation has been switched from OFF to ON) results in an affirmative determination. Consequently, the counter T is set (T=1), and counting up of the counter T is started. If switching of the target is taken into account, the process is performed as follows. At t51, if it is determined that switching of the target has occurred, the determination process at S405 (determination of whether switching of the collision avoidance subject target has occurred) results in an affirmative determination. Consequently, the correction condition is turned OFF, the activation timing is set back to the reference timing, and the counter T is reset (T=1). If, however, switching of the target is not taken into account, the process is performed as follows. At t52, the condition for steering operation is turned OFF. Then, at t53, a value of the counter T reaches the upper limit value Tmax, the correction condition is turned OFF, and the activation timing is set back to the reference timing. That is, the process for setting the activation timing to the corrected timing continues until t53.

As shown in FIG. 13B, at t54, the driver performs a steering operation in order to avoid a collision with the first target 61. In response to this, at t54, the correction condition for activation timing is turned ON, and the activation timing is set to the corrected timing whose value is less than that of the reference timing. At t54, the determination process at S408 (determination of whether the condition for steering operation has been switched from OFF to ON) results in an affirmative determination. Consequently, the counter T is set (T=1), and counting up of the counter T is started. Then, at t55, the condition for steering operation is turned OFF. If switching of the target is taken into account, the process is performed as follows. At t56, if it is determined that switching of the target has occurred, the determination process at S405 (determination of whether switching of the collision avoidance subject target has occurred) results in an affirmative determination. Consequently, the correction condition is turned OFF, the activation timing is set back to the reference timing, and the counter T is reset (T=1). If, however, switching of the target is not taken into account, the process is performed as follows. At t57, a value of the counter T reaches the upper limit value Tmax, the correction condition is turned OFF, and the activation timing is set back to the reference timing. That is, the process for setting the activation timing to the corrected timing continues until t57.

The configuration of the driving assist apparatus (driving assist ECU 10) according to the present embodiment produces the following effect.

For example, when a steering operation has been performed, the direction of travel of the own vehicle 40 changes. When a plurality of targets are present ahead of the own vehicle 40 in its direction of travel, therefore, even if a collision with one of the plurality of targets can be avoided, the own vehicle 40 may collide with another one of the plurality of targets. That is, when the activation timing of the safety device is delayed based on such a steering operation, a delay (delay in activation of the safety device) may occur in collision avoidance control for avoiding a collision with another one of the plurality of targets. According to the driving assist ECU 10 of the present embodiment, before determining whether the steering operation performed by the driver is the steering operation for avoiding a collision, it is determined whether switching of the collision avoidance subject target has occurred. According to the driving assist ECU 10, if it is determined that switching of the collision avoidance subject target has occurred, the activation timing of the safety device is set to the reference timing.

More specifically, for example, assume that when the driver attempts to avoid a collision with the first target 61 by performing a steering operation, the second target 62 is present in a steering direction toward which the steering operation has been performed. In such a situation, if the activation timing of the safety device has been continuously delayed, activation of the safety device with respect to the second target 62 may be delayed. According to the process (delaying process for delaying the activation timing according to the steering operation) according to the present embodiment, when switching of the collision avoidance subject target has occurred, the correction condition for activation timing is turned OFF, and the activation timing is changed from the corrected timing to the reference timing. This allows the driving assist apparatus of the present embodiment to prevent a delay in activation of the safety device even when the collision avoidance subject target is changed.

<Sixth Embodiment>

The driving assist apparatus of the present embodiment has the same overall configuration as the driving assist apparatus of the first embodiment. The driving assist apparatus of the present embodiment has some differences from the third embodiment in a delaying process for delaying an activation timing of the safety device.

The present embodiment relates to a process for delaying the activation timing of the safety device when a target is a preceding vehicle traveling ahead of the own vehicle 40 in the same direction as the he own vehicle 40's direction of travel. Specifically, according to the driving assist ECU 10 of the present embodiment, the operation state determination section 12 calculates, based on detection information provided from the target recognition section 11, an overlap ratio La, which is a value indicating a ratio at which the width of the own vehicle 40 overlaps with the width of the preceding vehicle, which is the target. Thus, according to the present embodiment, the operation state determination section 12 functions as an overlap ratio acquisition means. Based on the calculated overlap ratio La, the operation state determination section 12 changes a threshold (determination condition) for a steering angle, which threshold is used for determining whether the steering operation performed by the driver is the steering operation for avoiding a collision (determining whether the condition for steering operation is satisfied). FIG. 14 illustrates the overlap ratio La. With reference to FIG. 14, a description will be given of the overlap ratio La according to the present embodiment. For example, assume that Xw indicates the width of the own vehicle 40 and Xl indicates the width of a region of an overlap between the width of the own vehicle 40 and the width of the preceding vehicle, which is the target 60. In this case, the operation state determination section 12 calculates the overlap ratio La using formula (1) below.

$$La = Xl/Xw \qquad (1)$$

As illustrated in FIG. 14, for example, when sudden braking or the like is performed in the preceding vehicle, which is the target 60, as the overlap ratio La is greater and the relative distance Ly is shorter (as an overlap ratio between the width of the own vehicle 40 and the width of the preceding vehicle, which is the target 60, is greater), it is more difficult to avoid a collision unless the steering angle is large. On the other hand, if sudden braking or the like is performed in the preceding vehicle, which is the target 60, as the overlap ratio La is smaller and the relative distance Ly is longer (as the overlap ratio between the width of the own vehicle 40 and the width of the preceding vehicle, which is the target 60, is smaller), it is easier to avoid a collision even when the steering angle is small.

Thus, based on the calculated overlap ratio La, the operation state determination section 12 changes the threshold for the steering angle, which threshold is a determination condition for determining the steering operation for avoiding a collision. Specifically, as the overlap ratio La is smaller (or the overlap ratio La is smaller and the relative distance Ly is longer), it is easier to avoid a collision, and thus, the operation state determination section 12 changes the threshold to a smaller value. On the other hand, as the overlap ratio La is greater (or the overlap ratio La is greater and the relative distance Ly is shorter), it is more difficult to avoid a collision, and thus, the operation state determination section 12 changes the threshold to a greater value. The process for changing the threshold can be performed, for example, in the process at S305 shown in FIG. 8 or the process at S408 shown in FIG. 12.

The configuration of the driving assist apparatus (driving assist ECU 10) according to the present embodiment produces the following effect.

According to the driving assist ECU 10 of the present embodiment, if the overlap ratio La of the own vehicle 40 and the preceding vehicle, which is the target 60, is small so that it is easy to avoid a collision with a steering operation performed by the driver, the threshold for the steering angle, which threshold is a determination condition for determining the steering operation for avoiding a collision, is set to a smaller value. This allows the driving assist ECU 10 of the present embodiment to prevent unnecessary activation of the safety device when it is easy to avoid a collision by the driver.

<Modified Example>

According to the above-described embodiments, the TTC is compared with the activation timing, and based on the result of the comparison, it is determined whether to activate the safety device. According to a modified example, it may be determined whether to activate the safety device, for example, based not only on the result of the comparison between the TTC and the activation timing but also on the result of determination as to whether the target 60 is located in the determination region shown in FIG. 2. In this case, the depth L (forward limit value) of the determination region can be set based on the activation timing of the safety device.

The determination process for determining whether to activate the safety device can be performed, without setting the activation timing, based only on the result of the determination as to whether the target 60 is located in the determination region. In this case, a delaying process for delaying the activation timing of the safety device corresponds to a process for reducing the depth L (forward limit value) of the determination region.

According to the above-described embodiments, the activation timing of the safety device is changed from the corrected timing to the reference timing after the predetermined time period elapses (if a value of the counter T reaches the upper limit value Tmax). According to a modified example, for example, the activation timing may be corrected to a timing earlier than the corrected timing, instead of correcting the activation timing to the reference timing. As another modified example, a value may be gradually changed, for example, from the corrected timing to the reference timing (changed in stages from the activation timing to an earlier timing) in a predetermined time period (while the counter T is counted up).

According to the first embodiment, the activation timing of the safety device is set to the corrected timing, on condition that the accelerator is switched from ON to OFF. According to a modified example, for example, the correction condition for activation timing may be turned ON and the activation timing may be set to the corrected timing, on condition that an operation amount (accelerator opening degree) of the accelerator is smaller than an operation amount in the preceding control cycle (process performed last time). In this case, as a condition for turning OFF the correction condition for activation timing, a condition may be set that the operation amount of the accelerator is greater than the operation amount in the preceding control cycle. In regard to the correction process, the same applies to the second embodiment. In this case, a determination for the correction condition for activation timing may be made based on, for example, increase or decrease in operation amount (depression amount) of the brake pedal.

According to the third to sixth embodiments, the determination of whether the condition for steering operation (collision avoidance condition) has been satisfied is made based on the result of the determination as to whether the steering angle, which is an operation amount of the steering operation, is not less than the threshold. According to a modified example, for example, in addition to the process for comparing the steering angle with the threshold, a steering angle speed, which is a time differential value of the steering angle, may be calculated and the determination may be made by comparing the calculated steering angle speed with the threshold. This allows the modified example to determine whether a steering increasing operation has been performed, even when the own vehicle 40 is turning.

According to another modified example, for example, whether a steering operation has been performed may be determined, on condition that a deceleration operation has been performed. As the deceleration operation, at least one of an operation for reducing an operation amount of the accelerator and an operation for increasing an operation amount of the brake pedal. This allows the modified example to more precisely determine whether the steering operation performed by the driver is an operation (collision avoidance operation) based on a decision to avoid a collision. At this time, the operation state determination section 12 functions as a deceleration determination means for determining whether a deceleration operation has been performed by the driver as the collision avoidance operation.

According to another modified example, the threshold for the operation amount (steering angle) of the steering operation may be changed according to, for example, the speed of the own vehicle 40, the relative velocity between the own vehicle 40 and the target 60, or the like. Furthermore, the threshold may be changed according to the position (lateral position) of the target 60 relative to the own vehicle 40 in the lateral direction, or the like.

According to a modified example, the processes shown in the above embodiments may be combined and performed in parallel. In this case, for example, each correction amount for the correction condition which satisfies the condition is calculated, and the calculated correction amount is subtracted from the reference timing. A corrected timing may be calculated by performing such a process. That is, according to the modified example, the processes may be performed based on FIGS. 4, 6, and 8, depending on the type (accelerator operation, brake operation, steering operation, etc.) of collision avoidance operation.

According to another modified example, at least one of the reference timing and the corrected timing may be changed according to the type of target.

According to another modified example, a different value may be set, for each function of the safety device, as a correction amount to be subtracted from the reference timing when a corrected timing is calculated. For example, a greater correction amount may be set for the notification device 31 and a smaller correction amount may be set for the brake assist function and the automatic brake control function of the brake device 32. This is because activation of the brake assist function and the automatic brake control function is limited to a case where the probability of a collision between the own vehicle 40 and the target 60 increases. According to another modified example, the activation timing may be delayed only for the notification device 31.

According to the above-described embodiments, the driving assist apparatus is configured to avoid a collision of the own vehicle 40 with the target 60, which is located ahead of the own vehicle 40. The driving assist apparatus of the present disclosure is applicable to, for example, a driving assist system that detects a target 60 located behind the own vehicle 40 and avoids a collision of the own vehicle 40 with the target 60 thus detected. Furthermore, the driving assist apparatus of the present disclosure is applicable to a driving assist system that avoids a collision of the own vehicle 40 with a target 60 approaching the own vehicle 40. Note that the phrase "ahead of . . . in its direction of travel", which has been used in the descriptions of the above embodiments, means "ahead of the own vehicle 40" in a case where the own vehicle 40 is traveling forward. In a case where the own vehicle 40 is traveling backward, the phrase means "to the rear of the own vehicle 40".

According to the above embodiments, the notification device 31, the brake device 32, and the seat belt device 33 are mentioned as the safety device. However, the safety device connectable to the driving assist apparatus of the present disclosure is not limited to these devices. For example, a collision may be avoided by controlling a steering device.

REFERENCE SIGNS LIST

10: Driving assist ECU (driving assist apparatus), 11: Target recognition section, 12: Operation state determination section, 13: Activation timing calculation section, 14: Activation determination section, 15: Control processing section.

The invention claimed is:

1. A driving assist apparatus which activates a safety device for avoiding a collision of an own vehicle with a target present around the own vehicle for reducing damage from the collision, when there is a possibility that the own vehicle will collide with the target,
    the driving assist apparatus comprising:
    an operation determination means for determining whether a collision avoidance operation has been started by a driver, when the target is present around the own vehicle;
    a delaying means for performing a delaying process for delaying an activation timing at which the safety device is activated, when it is determined that the collision avoidance operation has been started, the delaying process setting the activation timing to a timing later than a timing that would be set when it is not determined that the collision avoidance operation has been started;
    an activation determination means for determining, based on the activation timing, whether to activate the safety device; and
    a subject selection means for selecting, among a plurality of the targets present around the own vehicle, a subject target that is subject to the delaying process based on a steering operation, wherein
    the delaying means continuously performs the delaying process until a predetermined time period elapses after the collision avoidance operation has been started,
    the collision avoidance operation includes the steering operation, and
    the delaying means ends the delaying process when the subject selection means switches the subject target.

2. The driving assist apparatus according to claim 1, wherein the collision avoidance operation includes an accelerator operation for reducing an accelerator opening degree that is an operation amount of an accelerator.

3. The driving assist apparatus according to claim 2, wherein the delaying means ends the delaying process when an operation for increasing the accelerator opening degree is performed while the delaying process is continuously performed.

4. The driving assist apparatus according to claim 1, wherein, when, before the predetermined time period elapses after the steering operation has finished, the steering operation is performed again, the delaying means performs the delaying process until the predetermined time period elapses after the steering operation has been performed again.

5. The driving assist apparatus according to claim 1, further comprising:
    a deceleration determination means for determining whether a deceleration operation has been performed as the collision avoidance operation, wherein
    the delaying means performs the delaying process when the steering operation has been started and the deceleration operation has been performed.

6. The driving assist apparatus according to claim 1, wherein:
    the collision avoidance operation further includes a brake operation for increasing a depression amount, that is an operation amount of a brake pedal; and
    when it is determined that the brake operation has been performed, the delaying means performs the delaying process and continuously performs the delaying process until the predetermined time period elapses after the brake operation has finished.

7. A driving assist apparatus, which activates a safety device for avoiding a collision of an own vehicle with a target present around the own vehicle for reducing damage from the collision, when there is a possibility that the own vehicle will collide with the target,
    the driving assist apparatus comprising:
    an operation determination means for determining whether a collision avoidance operation has been performed by a driver, when the target is present around the own vehicle;
    a delaying means for performing a delaying process for delaying an activation timing at which the safety device is activated, when it is determined that the collision avoidance operation has been performed, the delaying process setting the activation timing to a timing later than a timing that would be set when it is not determined that the collision avoidance operation has been performed;
    an activation determination means for determining, based on the activation timing, whether to activate the safety device; and
    a subject selection means for selecting, among a plurality of the targets present around the own vehicle, a subject target that is subject to the delaying process based on a steering operation, wherein
    the delaying means continuously performs the delaying process until a predetermined time period elapses after the collision avoidance operation has finished,
    the collision avoidance operation includes the steering operation, and
    the delaying means ends the delaying process when the subject selection means switches the subject target.

8. The driving assist apparatus according to claim 7, wherein, when, before the predetermined time period elapses after the collision avoidance operation has finished, the collision avoidance operation is performed again, the delaying means continuously performs the delaying process until the predetermined time period elapses after the collision avoidance operation has finished.

9. The driving assist apparatus according to claim 7, wherein the collision avoidance operation includes a brake operation for increasing a depression amount that is an operation amount of a brake pedal.

10. The driving assist apparatus according to claim 7 wherein:
the collision avoidance operation further includes an accelerator operation for reducing an accelerator opening degree, which is an operation amount of an accelerator; and
when it is determined that the steering operation or the accelerator operation has been started, the delaying means performs the delaying process and continuously performs the delaying process until the predetermined time period elapses.

11. The driving assist apparatus according to claim 1, further comprising:
a collision prediction means for calculating time to collision, based on a relative distance between the own vehicle and the target and a relative velocity or a relative acceleration between the own vehicle and the target, the time to collision being the time remaining until the own vehicle collides with the target, wherein
the activation determination means activates the safety device based on a result of a comparison between the activation timing and the time to collision.

12. A driving assist method that is performed by a driving assist apparatus which activates a safety device for avoiding a collision of an own vehicle with a target present around the own vehicle for reducing damage from the collision, when there is a possibility that the own vehicle will collide with the target,
the driving assist apparatus performing the steps of:
determining whether a collision avoidance operation has been started by a driver, when the target is present around the own vehicle;
performing a delaying process for delaying an activation timing at which the safety device is activated, when it is determined that the collision avoidance operation has been started, the delaying process setting the activation timing to a timing later than a timing that would be set when it is not determined that the collision avoidance operation has been started;
determining, based on the activation timing, whether to activate the safety device; and
selecting, among a plurality of the targets present around the own vehicle, a subject target that is subject to the delaying process based on a steering operation, wherein
at the delaying step, the delaying process is continuously performed until a predetermined time period elapses after the collision avoidance operation has been started,
the collision avoidance operation includes the steering operation, and
at the delaying step, the delaying process ends when the subject target is switched at the selecting step.

13. A driving assist method that is performed by a driving assist apparatus which activates a safety device for avoiding a collision of an own vehicle with a target present around the own vehicle for reducing damage from the collision, when there is a possibility that the own vehicle will collide with the target,
the driving assist apparatus performing the steps of:
determining whether a collision avoidance operation has been performed by a driver, when the target is present around the own vehicle;
performing a delaying process for delaying an activation timing at which the safety device is activated, when it is determined that the collision avoidance operation has been performed, the delaying process setting the activation timing to a timing later than a timing that would be set when it is not determined that the collision avoidance operation has been performed;
determining, based on the activation timing, whether to activate the safety device; and
selecting, among a plurality of the targets present around the own vehicle, a subject target that is subject to the delaying process based on a steering operation, wherein
at the delaying step, the delaying process is continuously performed until a predetermined time period elapses after the collision avoidance operation has finished,
the collision avoidance operation includes the steering operation, and
at the delaying step, the delaying process ends when the subject target is switched at the selecting step.

14. A driving assist apparatus, which activates a safety device for avoiding a collision of an own vehicle with a target present around the own vehicle for reducing damage from the collision, when there is a possibility that the own vehicle will collide with the target,
the driving assist apparatus comprising:
a memory;
a processor communicable to the memory; and
a set of computer-executable instructions stored on the memory that cause the processor to implement:
determining whether a collision avoidance operation has been started by a driver, when the target is present around the own vehicle;
performing a delaying process for delaying an activation timing at which the safety device is activated, when it is determined that the collision avoidance operation has been started, the delaying process setting the activation timing to a timing later than a timing that would be set when it is not determined that the collision avoidance operation has been started;
determining, based on the activation timing, whether to activate the safety device; and
selecting, among a plurality of the targets present around the own vehicle, a subject target that is subject to the delaying process based on a steering operation, wherein
the processor continuously performs the delaying process until a predetermined time period elapses after the collision avoidance operation has been started,
the collision avoidance operation includes the steering operation, and
the processor ends the delaying process when it switches the subject target.

15. A driving assist apparatus, which activates a safety device for avoiding a collision of an own vehicle with a target present around the own vehicle or reducing damage from the collision, when there is a possibility that the own vehicle will collide with the target,
the driving assist apparatus comprising:
a memory;
a processor communicable to the memory; and
a set of computer-executable instructions stored on the memory that cause the processor to implement:
determining whether a collision avoidance operation has been performed by a driver, when the target is present around the own vehicle;

performing a delaying process for delaying an activation timing at which the safety device is activated, when it is determined that the collision avoidance operation has been performed, the delaying process setting the activation timing to a timing later than a timing that would be set when it is not determined that the collision avoidance operation has been performed;

determining, based on the activation timing, whether to activate the safety device; and selecting, among a plurality of the targets present around the own vehicle, a subject target that is subject to the delaying process based on a steering operation, wherein the processor continuously performs the delaying process until a predetermined time period elapses after the collision avoidance operation has finished, the collision avoidance operation includes the steering operation, and the processor ends the delaying process when it switches the subject target.

* * * * *

UNITED STATES PATENT AND TRADEMARK OFFICE
CERTIFICATE OF CORRECTION

PATENT NO. : 10,252,716 B2
APPLICATION NO. : 15/562299
DATED : April 9, 2019
INVENTOR(S) : Akitoshi Minemura et al.

It is certified that error appears in the above-identified patent and that said Letters Patent is hereby corrected as shown below:

On the Title Page

Item (72), Line 3, under Inventors, change "Toyota (JP)" for Kazuki Nemoto to --Susono (JP)--.

In the Specification

In Column 13, Lines 38-39, change "performed:" to --performed;--.

In Column 13, Line 54, change "Sill" to --S111--.

In Column 14, Line 38, change "5B" to --5B,--.

In Column 14, Line 43, change "01," to --t11,--.

In Column 17, Line 43, change "suspended:" to --suspended;--.

In Column 19, Line 45, change "5211" to --S211--.

In Column 30, Line 38, change "XI" to --Xl--.

In the Claims

In Column 33, Line 36, Claim 1, change "apparatus" to --apparatus,--.

In Column 35, Line 35, Claim 12, change "apparatus" to --apparatus,--.

In Column 35, Line 63 (Approx.), Claim 13, change "apparatus" to --apparatus,--.

Signed and Sealed this
Sixteenth Day of July, 2019

Andrei Iancu
*Director of the United States Patent and Trademark Office*